(12) United States Patent
Gray

(10) Patent No.: US 10,740,834 B2
(45) Date of Patent: Aug. 11, 2020

(54) SYSTEM AND METHOD FOR IMPLEMENTING A HYBRID MARKETPLACE

(71) Applicant: Jeffrey Brian Gray, West Palm Beach, FL (US)

(72) Inventor: Jeffrey Brian Gray, West Palm Beach, FL (US)

( * ) Notice: Subject to any disclaimer, the term of this patent is extended or adjusted under 35 U.S.C. 154(b) by 916 days.

(21) Appl. No.: 15/150,098

(22) Filed: May 9, 2016

(65) Prior Publication Data
US 2016/0253749 A1  Sep. 1, 2016

Related U.S. Application Data

(63) Continuation-in-part of application No. 13/441,965, filed on Apr. 9, 2012, now Pat. No. 10,510,112, which is a continuation-in-part of application No. 12/902,872, filed on Oct. 12, 2010, now abandoned.

(60) Provisional application No. 62/158,901, filed on May 8, 2015, provisional application No. 61/250,582, filed on Oct. 12, 2009.

(51) Int. Cl.
*G06Q 30/08* (2012.01)
*G06Q 30/00* (2012.01)
*G06Q 30/06* (2012.01)

(52) U.S. Cl.
CPC ............ *G06Q 30/08* (2013.01); *G06Q 30/00* (2013.01); *G06Q 30/0641* (2013.01)

(58) Field of Classification Search
CPC .......................... G06Q 30/08; G06Q 30/0275
See application file for complete search history.

(56) References Cited

U.S. PATENT DOCUMENTS

| 7,472,076 | B2 * | 12/2008 | Garg | G06Q 30/02 |
| | | | | 705/26.3 |
| 2003/0061147 | A1 * | 3/2003 | Fluhr | G06Q 30/06 |
| | | | | 705/37 |
| 2006/0190387 | A1 * | 8/2006 | Molloy | G06Q 30/08 |
| | | | | 705/37 |

FOREIGN PATENT DOCUMENTS

AU  2006212860 A1 *  8/2006 ............. G06Q 30/08

OTHER PUBLICATIONS

Jarrod Trevathan Wayne Read, "A Software Architecture for Continuous Double Auctions" (2007), School of Mathematics Physics and Information Technology, James Cook University, pp. 1-11 (Year: 2007).*

(Continued)

*Primary Examiner* — Michael Misiaszek
*Assistant Examiner* — Jason B Warren
(74) *Attorney, Agent, or Firm* — Mitchell|Hamline IP Clinic

(57) ABSTRACT

A computer implemented continuous dual auction system consisting of a computer, server, and a process for creating a real-time, or substantially real-time, online marketplace for the sale of goods and services. The system allows a buyer to define parameters of one or more items that the buyer wishes to purchase and place a bid on all of the items that satisfy those parameters. The system automatically takes any fees to be paid by the buyer and the seller into account for a buyer's bid and a seller's offer. The system may be accessed via a web browser or a remote application.

13 Claims, 46 Drawing Sheets

(56) References Cited

OTHER PUBLICATIONS

Peter R Wurman et al "Flexible double auctions for electronic commerce: theory and implementation" (1998), Artificial Intelligence Laboratory, University of Michigan, pp. 17-27 (Year:1998) (Year: 1998).*

* cited by examiner

500

| | | |
|---|---|---|
| 502 → | Select a Username | |
| 504 → | Select a Password | |
| 506 → | Re-enter your password | |
| 508 → | Email address | |
| 510 → | Title | |
| 512 → | First name | |
| 514 → | MI | |
| 516 → | Last Name | |
| 518 → | Address | |
| 520 → | City | |
| 522 → | State | |
| 524 → | Zip | |
| 526 → | Daytime Phone | |
| 528 → | Evening Phone | |
| 530 → | Mobile Phone | |
| 532 → | I agree to the SlicketTicket User Agreement | v |
| 534 → | Yes, I would like to hear more about SlicketTicket's upcoming services and promotions | v |

FIG. 5

600
Username: xxxxxx

| | |
|---|---|
| 602 → | Credit Card [↓] |
| 604 → | Credit Card Number [ ] |
| 606 → | Exp. Date [↓] [↓] |
| 608 → | Sec. Code [ ] |
| 610 → | First name [ ] |
| 612 → | MI [ ] |
| 614 → | Last Name [ ] |
| 616 → | Billing Address [ ] |
| 618 → | Country [ ] |
| 620 → | City [ ] |
| 622 → | State [ ] |
| 624 → | Zip [ ] |
| 626 → | Phone [ ] |
| 628 → | Email [ ] |
| 630 → | [Continue] |

Event - Section - Venue - Date and Time      922      924
                                                ↓          ↓
News ← 916   Charts ← 918   Weather ← 920   Other Jimmy Buffet Auctions   Other Concert Auctions

902

| Bid $ Amt | Bid Qty | Sell Qty | Sell $ Amt |
|---|---|---|---|
|  |  | 4 | $800.00 |
|  |  | 6 | $750.00 |
|  |  | 8 | $600.00 |
|  |  | 2 | $525.00 |
|  |  | 2 | $510.00 |
|  |  | 2 | $500.00 |
| $408.00 | 2 |  |  |
| $400.00 | 2 |  |  |
| $400.00 | 2 |  |  |
| $103.00 | 8 |  |  |
| $48.00 | 10 |  |  |
| $22.00 | 10 |  |  |
| $10.00 | 10 |  |  |

904

| Last Trans | Date L T | Time L T |
|---|---|---|
| 2x$425 | 3/1/08 | 16:02 |
| 4x$500 | 3/1/08 | 14:57 |
| 2x$525 | 3/1/08 | 9:30 |
| 2x$525 | 2/29/08 | 12:40 |
| 2x$525 | 2/29/08 | 9:30 |
| 2x$650 | 2/28/08 | 14:20 |
| 2x$525 | 2/27/08 | 16:35 |
| 4x$550 | 2/26/08 | 8:16 |

906

| Best Bid | and | Best Offer |
|---|---|---|
| $408 for 2 |  | 2 at $500 |

910   Auction Market Closes on 3/5/08 at 4:00pm EST   ← 914

908   Current Offers

| 928 → | Sell Mkt | Ask - $5 | Ask - $20 | ← 926 |
| 930 → | Best Ask | Ask - $10 | Ask - $50 |  |
| 932 → | Inc. Qtyx2 | Cxl Ask | Ask - $100 |  |

| Order # | QTY | LSP | SP | Multiple |
|---|---|---|---|---|
| 437 | 4 | $520 | $560 | 2 |
| 486 | 2 | $1,000 | $950 | 1 |

934 → Submit

912

```
525
500
425
     3/1/08   3/1/08   3/1/08
```
← A clickable chart

Jimmy Buffet - Lower Level - MSG - 3/8/08 8pm    1022↓    1024↓

News ← 1016  Charts ← 1018  Weather ← 1020  Other Jimmy Buffet Auctions    Other Concert Auctions Sort Bids by: [▼] ← 1034

1002

| Bid $ Amt | Bid Qty | multiple | sell now | negotiate | Sell Qty | Sell $ Amt |
|---|---|---|---|---|---|---|
|  |  | ↑ 1026 | ↑ 1028 | ↑ 1030 | 4 | $800.00 |
|  |  |  |  |  | 6 | $750.00 |
|  |  |  |  |  | 8 | $600.00 |
|  |  |  |  |  | 2 | $525.00 |
|  |  |  |  |  | 2 | $510.00 |
|  |  |  |  |  | 2 | $500.00 |
| $408.00 | 2 | 2 ▼ | sell now | negotiate |  |  |
| $400.00 | 2 | 2 ▼ | sell now | negotiate |  |  |
| $400.00 | 2 | 1 ▼ | sell now | negotiate |  |  |
| $103.00 | 8 | 4 ▼ | sell now | negotiate |  |  |
| $48.00 | 10 | 2 ▼ | sell now | negotiate |  |  |
| $22.00 | 10 | 1 ▼ | sell now | negotiate |  |  |
| $10.00 | 10 | 4 ▼ | sell now | negotiate |  |  |

1004

| Last Trans | Date L T | Time L T |
|---|---|---|
| 2x$425 | 3/1/08 | 16:02 |
| 4x$500 | 3/1/08 | 14:57 |
| 2x$525 | 3/1/08 | 9:30 |
| 2x$525 | 2/29/08 | 12:40 |
| 2x$525 | 2/29/08 | 9:30 |
| 2x$650 | 2/28/08 | 14:20 |
| 2x$525 | 2/27/08 | 16:35 |
| 4x$550 | 2/26/08 | 8:16 |

1006

| Best Bid | and | Best Offer |
|---|---|---|
| $408 for 2 |  | 2 at $500 |

Auction Market Closes on 3/5/08 at 4:00pm EST

1010

| Sell Mkt | Ask - $5 | Ask - $20 |
|---|---|---|
| Best Ask | Ask - $10 | Ask - $50 |
| Inc. Qtyx2 | Cxl Offer | Ask - $100 |

1032 →  [enter new offer]

← 1014

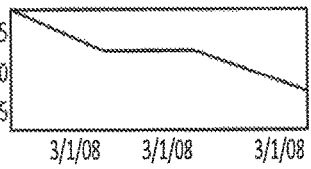

1012
525
500
425
3/1/08  3/1/08  3/1/08
← A clickable chart

Current Orders

1008

| # | LP to Sell | Pr Show | QTY | multiple |   |
|---|---|---|---|---|---|
| 1 | $490 | $525 | 2 | 2 | modify |
| 2 | $575 | $600 | 2 | 2 | modify |

Username: ZZZZZZZ

| | | |
|---|---|---|
| 1102 → | Event Name | |
| 1104 → | Date | |
| 1106 → | Time | |
| 1108 → | Venue | |
| 1110 → | Section | |
| 1112 → | Row | |
| 1114 → | Seat #s | |
| 1116 → | Obstructed View | |
| 1118 → | Lowest price willing to Sell | |
| 1120 → | Lowest Price to show | |
| 1122 → | Quantity Desired to sell | |
| 1124 → | Multiple | |
| 1126 → | Continue | |

FIG. 11

1200
Username: xxxxxx

| | | |
|---|---|---|
| 1202 → | Select a Credit Card | ↓ |
| 1204 → | Security Code | |
| 1206 → | Email Address | |
| | or | |
| 1208 → | Credit Card | ↓ |
| 1210 → | Credit Card Number | |
| 1212 → | Exp. Date | ↓  ↓ |
| 1214 → | Sec. Code | |
| 1216 → | First name | |
| 1218 → | MI | |
| 1220 → | Last Name | |
| 1222 → | Billing Address | |
| 1224 → | Country | |
| 1226 → | City | |
| 1228 → | State | |
| 1230 → | Zip | |
| 1232 → | Phone | |
| 1234 → | Email | |
| 1236 → | Continue | |

Event - Section - Venue - Date and Time          1622          1624
                                                   ↓               ↓
News  ← 1616  Charts  ← 1618  Weather  ← 1620  Other Jimmy Buffet Auctions    Other Concert Auctions

1602

| Bid $ Amt | Bid Qty | Sell Qty | Sell $ Amt |
|---|---|---|---|
|  |  | 4 | $800.00 |
|  |  | 6 | $750.00 |
|  |  | 8 | $600.00 |
|  |  | 2 | $525.00 |
|  |  | 2 | $510.00 |
|  |  | 2 | $500.00 |
| $408.00 | 2 |  |  |
| $400.00 | 2 |  |  |
| $400.00 | 2 |  |  |
| $103.00 | 8 |  |  |
| $48.00 | 10 |  |  |
| $22.00 | 10 |  |  |
| $10.00 | 10 |  |  |

| Last Trans | Date LT | Time LT |
|---|---|---|
| 2x$425 | 3/1/08 | 16:02 |
| 4x$500 | 3/1/08 | 14:57 |
| 2x$525 | 3/1/08 | 9:30 |
| 2x$525 | 2/29/08 | 12:40 |
| 2x$525 | 2/29/08 | 9:30 |
| 2x$650 | 2/28/08 | 14:20 |
| 2x$525 | 2/27/08 | 16:35 |
| 4x$550 | 2/26/08 | 8:16 |

1604

| Best Bid  and  Best Offer |
|---|
| $408 for 2     2 at $500 |

1606 ← Current Best Bid and Offer

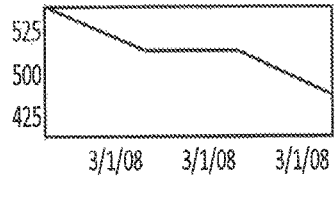

1612 ← A clickable chart

1614
           ↓
Auction Market Closes on 3/5/08 at 4:00pm EST

1610

| | | | |
|---|---|---|---|
| 1628→ Buy Mkt | Bid + $5 | Bid + $20 | ← 1626 |
| 1634→ Best Bid | Bid + $10 | Bid + $50 | |
| 1630→ Inc. Qtyx2 |  | Bid + $100 | |

Current Orders

| | HP Pay | Pr Show | QTY | AON |
|---|---|---|---|---|
| 1 | $475 | $400 | 2 | y |
| 2 | $475 | $400 | 2 | n |

1608

1632→ Submit

Jimmy Buffet - Lower Level - MSG - 3/8/08 8pm        1722          1724
                                                      ↓            ↓
News ← 1716  Charts ← 1718 Weather ← 1720 Other Jimmy Buffet Auctions   Other Concert Auctions Sort Sellers by: [ ] ← 1734   1726  1728  1730
1702                           ↓    ↓     ↓

| Bid $ Amt | Bid Qty | Sell Qty | Sell $ Amt | multiple | buy now | negotiate | | Last Trans | Date LT | Time LT | 1704 |
|---|---|---|---|---|---|---|---|---|---|---|---|
| | | 4 | $800.00 | 2 | buy now | negotiate | | 2x$425 | 3/1/08 | 16:02 | |
| | | 6 | $750.00 | 2 | buy now | negotiate | | 4x$500 | 3/1/08 | 14:57 | |
| | | 8 | $600.00 | 4 | buy now | negotiate | | 2x$525 | 3/1/08 | 9:30 | |
| | | 2 | $525.00 | 1 | buy now | negotiate | | 2x$525 | 2/29/08 | 12:40 | |
| | | 2 | $510.00 | 2 | buy now | negotiate | | 2x$525 | 2/29/08 | 9:30 | |
| | | 2 | $500.00 | 1 | buy now | negotiate | | 2x$650 | 2/28/08 | 14:20 | |
| $408.00 | 2 | | | | | | | 2x$525 | 2/27/08 | 16:35 | |
| $400.00 | 2 | | | | | | | 4x$550 | 2/26/08 | 8:16 | |
| $400.00 | 2 | | | | | | | | | | |
| $103.00 | 8 | | | | | | | Best Bid and | | Best Offer | 1706 |
| $48.00 | 10 | | | | | | | | | | |
| $22.00 | 10 | | | | | | | $408 for 2 | | 2 at $500 | |
| $10.00 | 10 | | | | | | | | | | |

Auction Market Closes on 3/5/08 at 4:00pm EST    ← 1714    1712
1710

| Buy Mkt | Bid + $5 | Bid + $20 |
|---|---|---|
| Best Bid | Bid + $10 | Bid + $50 |
| Inc. Qtyx2 | Cxl Bid | Bid + $100 |

525
500  <-- A clickable chart
425
3/1/08  3/1/08  3/1/08

1708
Current Orders

| | HP Pay | Pr Show | QTY | multiple | |
|---|---|---|---|---|---|
| 1 | $475 | $400 | 2 | 2 | modify |
| 2 | $475 | $400 | 2 | 2 | modify |

1732 → [enter new bid]

Username: YYYYYY

| | | |
|---|---|---|
| 1802 → | Event Name | xxxxxxx Concert |
| 1804 → | Date | 3/15/08 |
| 1806 → | Time | 8pm |
| 1808 → | Venue | venue |
| 1810 → | Section | 115, 117, 118, 123 |
| 1812 → | Row | 7 -18 |
| 1814 → | Highest Price willing to pay | $650 |
| 1816 → | Highest Price to show | $500 |
| 1818 → | Quantity Desired to buy | #4 |
| 1820 → | Multiple | 4 |
| 1822 → | Continue to login or choose credit card | |

Username: xxxxxxx

| | | |
|---|---|---|
| 1902 → | Select a Credit Card | [↓] |
| 1904 → | Security Code | [ ] |
| 1906 → | Email Address | [ ] |
| | or | |
| 1908 → | Credit Card | [↓] |
| 1910 → | Credit Card Number | [ ] |
| 1912 → | Exp. Date | [↓] [↓] |
| 1914 → | Sec. Code | [ ] |
| 1916 → | First name | [ ] |
| 1918 → | MI | [ ] |
| 1920 → | Last Name | [ ] |
| 1922 → | Billing Address | [ ] |
| 1924 → | Country | [ ] |
| 1926 → | City | [ ] |
| 1928 → | State | [ ] |
| 1930 → | Zip | [ ] |
| 1932 → | Phone | [ ] |
| 1934 → | Email | [ ] |
| 1936 → | [Continue] | |

Seller Id # 10376
Seller Firm: American Ticket Brokers
Seller Name: Jane Doe

Jimmy Buffet - Lower Level - MSG - 3/8/08 8pm

Quantity
Multiple
Price
Proxy Price

Cancel Offer By ← 2202

Cancel Offer Upon Another Offers Execution for This Event ← 2204
Cancel Offer Upon Another Offers Execution for This Event in Level ← 2206
Cancel Offer Upon Another Offers Execution for This Event in Sections ← 2208
Cancel Offer Upon Another Offers Execution for This Event in Rows ← 2210
Cancel Offer Upon Another Offers Execution for This Event Before This Date ← 2212
Cancel Offer Upon Another Offers Execution for This Event If that Price is Higher Than ← 2214
Cancel Offer Upon Another Offers Execution for This Event If That Price is Lower Than ← 2216

Submit

| | | | |
|---|---|---|---|
| Buyer/Seller | Seller | Current Best Bid | Current Best Offer |
| Event | Jimmy Buffett | Bid Price  Bid Qty  Multiple | Offer Price  Offer Qty  Multiple |
| Event Location | Madison Square Garden | $  #  # | $  #  # |
| Event Date | 3/8/08 | | |
| Event Time | 8:00pm | | |
| Level | Lower Level | | |
| Sections | 102,103, 104, 112, 113, 114 | | |
| Rows | Rows 9-18 | | |

Location of Seats/Description of Goods

Section  [ ]
Row      [ ]
Seats    [ ]

Modify your Offer below

Quantity     [ ]  ← 2302
Multiple     [ ]  ← 2304
Price        [ ]  ← 2306
Proxy Price  [ ]  ← 2308

Original Offer Posted

| Bid Price | Bid Qty | Multiple | Proxy Bid |
|---|---|---|---|
| $ | # | # | $ |

Cancel Offer By    [ ]  ← 2310

Cancel Offer Upon Another Offers Execution for This Event                              [ ]  ← 2312
Cancel Offer Upon Another Offers Execution for This Event in Level                     [ ]  ← 2314
Cancel Offer Upon Another Offers Execution for This Event in Sections                  [ ]  ← 2316
Cancel Offer Upon Another Offers Execution for This Event in Rows                      [ ]  ← 2318
Cancel Offer Upon Another Offers Execution for This Event Before This Date             [ ]  ← 2320
Cancel Offer Upon Another Offers Execution for This Event If that Price is Higher Than [ ]  ← 2322
Cancel Offer Upon Another Offers Execution for This Event if That Price is Lower Than  [ ]  ← 2324

Account Manager
User: Gators96        [Active Negotiations] [Completed Orders] [Active Orders]
Buyer  [Seller]

Active Orders:
       View By: [____] ← 2426

2424
                                                                               ↓
                                                                          Cancel Upon
                                                          Best Bid/ Best  Other Orders  Order
Order #  Type    Event          Qty  Price     Level   Sections          Rows    Offer       Negotiating  Execution    Criteria Aisle
                                                                                                                        Seats
   1    Seller  Frank Sinatra    2   $400.00   Upper   401 - 404, 411 - 414  1 - 20  $220/$300              2            Only
                2/18/09

2    Seller  Frank Sinatra    2   $650.00   Middle  301 - 304, 311 - 314  1 - 20  $400/$600    y         1
                2/18/09

Rows 1-
   3    Seller  Pearl Jam        2   $1,100.00 Lower   101 - 104, 111 - 114  1 - 20  $800/$1000                         10
                5/5/09

4    Seller  UB 40            2   $175.00   GA      Standing Room         1 - 20  $80/$125
                11/18/09

5    Seller  Pearl Jam        2   $3,000.00 Suite   201 - 204, 211 - 214  1 - 20  $1200/$1300
                5/5/09

Cancel All Offers with Row or Row Range                              [____] ← 2416
       Cancel All Offers Placed Before Date/Time:                           [____] ← 2418
       Cancel All Offers Entered Before Offer                               [____] ← 2420
       Cancel All Offers Entered After Offer                                [____] ← 2422
       Cancel All Offers Upon Another Offers Execution for This Event                              [____] ← 2402
       Cancel All Offers Upon Another Offers Execution for This Event in Level                     [____] ← 2404
       Cancel All Offers Upon Another Offers Execution for This Event in Sections                  [____] ← 2406
       Cancel All Offers Upon Another Offers Execution for This Event in Rows                      [____] ← 2408
       Cancel All Offers Upon Another Offers Execution for This Event Before This Date             [____] ← 2410
       Cancel All Offers Upon Another Offers Execution for This Event If that Price is Higher Than [____] ← 2412
       Cancel All Offers Upon Another Offers Execution for This Event if That Price is Lower Than  [____] ← 2414

Bidder Username: Gator96

Jimmy Buffet - Lower Level - MSG - 3/8/08 8pm

Quantity
Multiple
Price
Proxy Price

Row or Row Range Range
Item Needed By:
Aisle Seats
Cancel Bid By  ← 2502

Cancel Bid Upon Another Bids Execution for This Event ← 2504
Cancel Bid Upon Another Bids Execution for This Event in Level ← 2506
Cancel Bid Upon Another Bids Execution for This Event in Sections ← 2508
Cancel Bid Upon Another Bids Execution for This Event in Rows ← 2510
Cancel Bid Upon Another Bids Execution for This Event Before This Date ← 2512
Cancel Bid Upon Another Bids Execution for This Event If that Price is Higher Than ← 2514
Cancel Bid Upon Another Bids Execution for This Event If That Price is Lower Than ← 2516

Submit

| | | | | | | | |
|---|---|---|---|---|---|---|---|
| Buyer/Seller | Buyer | | Current Best Bid | | | Current Best Offer | |
| Event | Jimmy Buffett | | Bid Price | Bid Qty | Multiple | Offer Price | Offer Qty | Multiple |
| Event Location | Madison Square Garden | | $ | # | # | $ | # | # |
| Event Date | 3/8/08 |
| Event Time | 8:00pm |
| Level | Lower Level |
| Sections | 102,103, 104, 112, 113, 114 |
| Rows | Rows 9-18 |

Location of Seats/Description of Goods
Section
Row
Seats

Row or Row Range Range
Item Needed By:
Aisle Seats
Cancel Bid By

Modify your Bid below

Quantity  ← 2602
Multiple  ← 2604
Price  ← 2606
Proxy Price  ← 2608

Cancel Bid By  ← 2610

Cancel Bid Upon Another Bids Execution for This Event  ← 2612
Cancel Bid Upon Another Bids Execution for This Event in Level  ← 2614
Cancel Bid Upon Another Bids Execution for This Event in Sections  ← 2616
Cancel Bid Upon Another Bids Execution for This Event in Rows  ← 2618
Cancel Bid Upon Another Bids Execution for This Event Before This Date  ← 2620
Cancel Bid Upon Another Bids Execution for This Event If that Price is Higher Than  ← 2622
Cancel Bid Upon Another Bids Execution for This Event If That Price is Lower Than  ← 2624

Account Manager
User: Gators96
[Buyer] Seller
Active Orders:
View By: [____] ← 2728

[Active Negotiations] [Completed Orders] [Active Orders]

2726
↓
Cancel Upon
Other Orders

| Order # | Type | Event | Qty | Price | Level | Sections | Rows | Best Bid/ Best Offer | Negotiating | Execution | Order Criteria |
|---|---|---|---|---|---|---|---|---|---|---|---|
| 1 | Buyer | Jimmy Buffet 11/18/09 | 2 | $200.00 | Upper | 401 - 404, 411 - 414 | 1 - 20 | $220/$300 | | 2 | Aisle Seats Only |
| 2 | Buyer | Jimmy Buffet 11/18/09 | 2 | $300.00 | Middle | 301 - 304, 311 - 314 | 1 - 20 | $400/$600 | y | 1 | |
| 3 | Buyer | Jimmy Buffet 11/18/09 | 2 | $600.00 | Lower | 101 - 104, 111 - 114 | 1 - 20 | $800/$1000 | | | Rows 1-10 |
| 4 | Buyer | Jimmy Buffet 11/18/09 | 2 | $50.00 | GA | Standing Room | 1 - 20 | $80/$125 | | | |
| 5 | Buyer | Jimmy Buffet 11/18/09 | 2 | $1,000.00 | Suite | 201 - 204, 211 - 214 | 1 - 20 | $1200/$1300 | | | |

Cancel All Bids with Row or Row Range [____] ← 2716
Cancel All Bids Placed Before Date/Time: [____] ← 2718
Cancel All Bids Entered Before Bid [____] ← 2720
Cancel All Bids Entered After Bid [____] ← 2722
Cancel All Aisle Seat Bids [____] ← 2724
Cancel All Bids Upon Another Bids Execution for This Event [____] ← 2702
Cancel All Bids Upon Another Bids Execution for This Event in Level [____] ← 2704
Cancel All Bids Upon Another Bids Execution for This Event in Sections [____] ← 2706
Cancel All Bids Upon Another Bids Execution for This Event in Rows [____] ← 2708
Cancel All Bids Upon Another Bids Execution for This Event Before This Date [____] ← 2710
Cancel All Bids Upon Another Bids Execution for This Event If that Price is Higher Than [____] ← 2712
Cancel All Bids Upon Another Bids Execution for This Event If That Price is Lower Than [____] ← 2714

2902 → Events / Items

2904 → Miami Heat v. New York Knicks  
Madison Square Garden  
11/18/09 8pm  
2912 → Buy    2914 → Sell

2906 → Miami Orchestra  
Miami Arena  
3/3/10 3pm  
2912 → Buy    2914 → Sell

2908 → Miami Dolphins v. Chicago Bears  
Soldier Field  
9/14/10 4pm  
2912 → Buy    2914 → Sell

2910 → Miami Vice Series  
2912 → Buy    2914 → Sell

Event Name or Item   Miami Heat v. New York Knicks
Location             Madison Square Garden
Date/Time            11/18/09

|  |  | 3012<br>Best Offer | 3014<br>Best Bid |
|---|---|---|---|
| 3016 → | Select Level |  |  |
| 3004 → ▨ | Lower Level | $85.00 | $65.00 |
| 3006 → ▦ | Middle Level | $42.00 | $41.00 |
| 3008 → ⋯ | Upper Level | $18.00 | $17.00 |
| 3010 → ▰ | Floor Level | $200.00 | $140.00 |

3002

3100

Event Name or Item   Miami Heat v. New York Knicks
Location             Madison Square Garden
Date/Time            11/18/09

Auctions in Upper Level Category

| | | 3106 | 3108 |
|---|---|---|---|
| 3110 → Select Sections | Rows | Best Offer | Best Bid |
| 401 - 404, 411 - 414 | 1-45 | $24.00 | $22.00 |
| 3104  405 - 406, 409 - 410, 415-416, 419-420 | 1-40 | $18.00 | $17.00 |
| 407 - 408, 417 - 418 | 1-40 | $22.00 | $21.00 |

3102

3200

| | |
|---|---|
| Event Name or Item | Miami Heat v. New York Knicks |
| Location | Madison Square Garden |
| Date/Time | 11/18/09 |

Auctions in Upper Level Category

| Groups of Rows | Rows | 3206 Best Offer | 3210 View Tickets | 3208 Best Bid | 3212 View Tickets |
|---|---|---|---|---|---|
| 401 - 404, 411 - 414 | 1-20 | $23.00 | View | $22.00 | View |
| 405 - 406, 409 - 410, 415-416, 419-420 | 1-20 | $22.00 | View | $17.00 | View |
| 407 - 408, 417 - 418 | 1-20 | $23.00 | View | $21.00 | View |
| 401 - 404, 411 - 414 | 21-45 | $24.00 | View | $22.00 | View |
| 405 - 406, 409 - 410, 415-416, 419-420 | 21-40 | $18.00 | View | $15.00 | View |
| 407 - 408, 417 - 418 | 21-40 | $22.00 | View | $19.00 | View |

3204

3202

3600

The inventory file being monitored is reflected below. Whenever the user updates their original file, it will automatically be updated in the monitoring program. It should also be stated that the user can control all of their inventory directly from this program, if they wish, instead of using an inventory file. The file will include all details of the listing. The below is an example.

| Order # | Item/Event Name | Action | Order Price | Best Bid | Best Offer |
|---------|-----------------|--------|-------------|----------|------------|
| 7546 | Tickets | Buyer | $30 | $40 | $65 |
| 63 | Tickets | Buyer | $25 | $50 | $60 |
| 001 | Tickets | Buyer | $50 | $55 | $75 |
| 8 | Tickets | Seller | $85 | $40 | $60 |
| 3256 | Tickets | Seller | $100 | $40 | $75 |

3602, 3606, 3610, 3612, 3608, 3604

[ New Negotiation ] [ Counter Negotiation ] [ New Bid ] [ New Offer ] [ Create New Order ]

| Order # | Item/Event Name | Action | Order Price | Best Bid | Best Offer |
|---|---|---|---|---|---|
| 2546 | Tickets | Buyer | $20 | $40 | $65 |
| 63 | Tickets | Buyer | $25 | $50 | $60 |
| 001 | Tickets | Buyer | $50 | $55 | $75 |
| | Tickets | Seller | $85 | $85 | $90 |
| 325 | Tickets | Seller | $100 | $40 | $75 |

New Bid Alert — Notice how the bid changed

[Negotiate] [Sell Now] Buttons appear and coordinate when an alert occurs

New Buy Negotiation Alert

| Order # | Item/Event Name | Action | Order Price | | Best Bid | Best Offer |
|---|---|---|---|---|---|---|
| 2546 | Tickets | Buyer | $20 | | $40 | $65 |
| 65 | Tickets | Buyer | $25 | | $50 | $60 |
| 001 | Tickets | Buyer | $50 | 4012 | $55 | $75 |
| 8 | Tickets | Seller | $85 | | $40 | $60 |
| 1236 | Tickets | Seller | $100 | New Buy Negotiation | $40 | $75 |

4010

[ Sell Now ]   [ Counter Negotiate ]

Date:
Activity since last update

Sold 4602

| Event | Date | Location | Section | Row | Quantity | Transaction Price | Remaining Quantity | Listed Price |
|---|---|---|---|---|---|---|---|---|
| Jimmy Buffett | 23-Apr-96 | Madison Square Garden, NY | NA | NA | 4 | $300 | 0 | NA |
| The Beatles | 17-Oct-96 | Miami Arena, FL | D | 18 | 2 | $58 | 4 | $85 |
| The Who | 9-Nov-96 | Staples Center, CA | General Admission | NA | 3 | $155 | 1 | $175 |

Updated Listings 4603

Price

| Event | Date | Location | Section | Row | Quantity | Old Price | New Price |
|---|---|---|---|---|---|---|---|
| ColdPlay | 23-Apr-96 | Giants Stadium, NJ | 400 | 7 | 8 | $300 | $290 |
| The Beatles | 17-Oct-96 | Miami Arena, FL | Club 18 | 2 | 4 | $150 | $165 |
| The Who | 9-Nov-96 | Staples Center, CA | Floor | C | 5 | $125 | $135 |

Quantity 4604

| Event | Date | Location | Section | Row | Price | Old Quantity | New Quantity |
|---|---|---|---|---|---|---|---|
| Jimmy Buffett | 23-Apr-96 | Madison Square Garden, NY | 400 | 7 | $200 | 8 | 6 |
| Taylor Swift | 17-Oct-96 | RFK Stadium, DC | 213 | 8 | $115 | 2 | 4 |
| Rolling Stones | 9-Nov-96 | Astrodome, TX | 10 | AA | $325 | 1 | 4 |

New Listings 4605

| Event | Date | Location | Section | Row | Quantity | Price |
|---|---|---|---|---|---|---|
| Jimmy Buffett | 23-Apr-96 | Madison Square Garden, NY | 215 | 6 | 4 | $300 |
| Jimmy Buffett | 23-Apr-96 | Madison Square Garden, NY | 400 | 7 | 4 | $225 |
| The Beatles | 17-Oct-96 | Miami Arena, FL | D | 18 | 2 | $100 |
| The Who | 9-Nov-96 | Staples Center, CA | General Admission | NA | 3 | $155 |
| The Who | 9-Nov-96 | Staples Center, CA | Floor | C | 5 | $125 |

Deleted Listings 4606

| Event | Date | Location | Section | Row | Quantity | Price |
|---|---|---|---|---|---|---|
| Wizard of Oz | 24-Sep-97 | Winter Park Theatre, FL | Left | 3 | 2 | $100 |
| Miami Heat vs. Chicago Bulls | 24-Dec-07 | United Center, IL | 315 | 16 | 10 | $550 |

FIG. 46

SYSTEM AND METHOD FOR IMPLEMENTING A HYBRID MARKETPLACE

RELATED APPLICATIONS

The present application claims priority to U.S. Provisional Application No. 62/158,901 filed on May 8, 2015 entitled Computer Implemented Continuous Dual Auction System and to U.S. Non-Provisional application Ser. No. 13/441,965 filed on Apr. 9, 2012 entitled Computer Implemented Continuous Dual Auction System, which application claims priority to U.S. Non-Provisional application Ser. No. 12/902,872 filed on Oct. 12, 2010 entitled Computer Implemented Continuous Dual Auction System, which application claims priority to U.S. Provisional Application No. 61/250,582 filed on Oct. 12, 2009 entitled Computer Implemented Continuous Dual Auction System, the contents of each of which are hereby incorporated by reference herein in their entireties.

FIELD OF THE INVENTION

The present disclosure generally relates to a computer implemented continuous dual auction system. More specifically, the present disclosure relates to a computer implemented continuous dual auction system, including a computer, server, database, real-time, or substantially real-time, online marketplace website, and process for the creation of an online marketplace for the selling and buying of goods and services.

BACKGROUND

In an effort to meet the growing demand of electronic shopping, virtual online marketplaces have been setup, providing websites to host these online marketplaces for the sale and purchase of goods and services. One way for companies, as well as individuals, to buy and sell goods and services through online marketplaces is through the use of online auctions. Traditionally, the most common types of online auctions used are forward auctions, reverse auctions, Dutch auctions, French auctions, Vickrey auctions, and uniform second price auctions.

In forward auctions, buyers submit competing bids for one product and only one buyer can win once the auction ends. In this type of auction, the price starts low with the bidders increasing their bids at certain intervals and within a predetermined amount. This type of auction favors the seller, as the auction tends to raise the price. Remaining bidders may be annoyed as they walk away with nothing at the end and could have spent their time elsewhere with a better outcome.

In a reverse auction, sellers compete for the buyer's bid. A buyer will post a bid for a given service or product, and the sellers will compete to win the bid. This type of auction is beneficial to the buyer as the transaction price is usually lower than the seller would have normally considered. The reverse auction is not a fair auction because the seller cannot base many different bids against each other to create a true market. This means that the reverse auction does not create a fair competition for the said product.

In a Dutch auction, the auctioneer announces a price for a particular good or service. Usually, the price falls in equal increments until a bid is created from the market. These types of auctions tend to leave buyers second-guessing themselves as if they could have let the price fall further. The Dutch auction is not a particularly fair market due to not being able to see and feel the other bids of the marketplace.

In a French auction, all of the buyers' bids and sellers' offers are submitted to the auctioneer in confidence. The auctioneer then decides where to open the stock based on these confidences to create the fair price for the particular security. These types of auctions are mainly used for the opening of a security and do not usually create enough interest to keep an auction going. Throughout a trading day interest in a particular security may increase or decrease, appear or disappear.

In a Vickrey auction, buyers submit bids in confidence to the auctioneer. After collection of all bids, the auctioneer notifies the highest bidder that he has won; however, he only has to pay the second highest bid price. This leaves the winning bidder without thoughts that they overpaid for the item because someone else was also willing to pay this price. However, this does leave the second highest bidder with remorse as they should have "won," in the sense that the item is being sold at the bid the second highest bidder offered, and now must go to another source to obtain the item. This type of auction allows buyers to bid the "true value" of an item, i.e., the value of an item is worth what someone else is willing to pay for it.

In a uniform second price auction, the auction operates similar to a Vickrey auction except there are multiple units of an item to be sold rather than one item. All buyers' bids are submitted in confidence with the amount they are willing to pay as well as the quantity of the item wanted. Once the auction closes, the buyer with the highest bid gets the quantity he requested. The auctioneer then goes to the next highest bid wherein that buyer gets the amount he requested, and so forth until there are no more units. The winning buyers will all pay the price of the lowest winning bid.

A continuous double auction (CDA) is much like the NYSE or NASDAQ stock market. Most of the world's stock markets today use the CDA mechanism. In the CDA multiple bidders compete for the commodity of multiple sellers as well as multiple sellers competing for multiple bidders. This creates true price discovery and dictates to the market a commodity's true value. The CDA is continuous because the market will not close upon execution of an order. As long as there is at least one bidder and/or one seller, the auction remains open. Also, within the CDA all participants may see all open orders for that particular commodity. All bids and offers are broadcast to the market. Upon an execution, only the affected parties will be removed from the auction as long as they do not have any quantity left to fill or they may cancel the remainder of their order. The CDA features a true price discovery and creates a fair market value of whatever commodity is being traded. An execution will occur when a seller lowers their offer to the highest bid or when a bidder raises their bid to the lowest offer. Until then, all bids and offers remain on the books in the order of precedence, typically first by price, then by time regardless of quantity. The CDA is the fairest of all auction mechanisms as all bidders and all sellers may view the depth and breadth of the market and never walk away feeling remorse. Only outside influences will fluctuate the effecting transaction inducing the fair market value of a commodity.

There is a need for an auction system adapted for the online marketplace for the sale and purchase of goods and services where the benefits of a true supply and demand model can be realized. In other known online marketplaces, it is far more likely that either the seller dictates the price or the buyer dictates a price. A buyer dictated or seller dictated price might be characterized as an unfair marketplace because the true "price" of a good or service may not be discovered. By allowing all buyers and sellers to compete against one another in a real-time, or substantially real-time, online marketplace, a true price may be discovered and both buyer and seller can be satisfied.

SUMMARY

In one embodiment, a computer implemented continuous dual auction system may include a server to house all of the various databases available for the different types of items being sold and/or offered for sale. The system may also store user account information. The system may also include a website that allows the interaction between different users in the sale and purchasing of items and different ways for the selling and buying of items. The computer implemented continuous dual auction system may provide a way for the user to buy and/or sell goods or services in a real-time, or substantially real-time, online marketplace. In another embodiment, the computer implemented continuous dual auction system may also provide additional security because of its guaranty and authorization system.

In another embodiment, the computer implemented continuous dual auction system may provide the ability for the users to enter proxy bids and proxy offers that are hidden from the other users of the real-time, or substantially real-time, auction market. One aspect of the proxy system may be that it allows for a sale or purchase to happen within set price parameters setup by a user. Another aspect of the proxy system may be that it allows the user to step away from the market without risking missing another's matching bid or offer for a particular item in a given online marketplace. The proxy system may allow for the sale or purchase to happen at a price the user specifies without the user being constantly logged in and actively watching the marketplace. One benefit of this proxy system may be that the user can be doing other things and still maintain an active order in the marketplace. Another benefit may be that the user is able to transact with another user within their set parameters while away from the marketplace.

In another embodiment, a real-time, or substantially real-time, online marketplace may be provided wherein both the buyer and seller can see other bids and offers, as well as their own. Both buyers and sellers may be able to show their bids and offers, respectively, to the marketplace in order to try to entice the counterparty to raise their bid or lower their offer. A further embodiment may include the online marketplace being continuous, wherein an auction is open as long as there is a bid or offer for a certain good or service. In one embodiment, when a buyer and seller transact, it may be that only that buyer and that seller are removed from the marketplace as they have fulfilled their sale or purchase. All other buyers and sellers may remain in the marketplace. In another embodiment, a buyer or seller may remain in the marketplace if their entire order has not yet been fulfilled. For instance, a buyer may transact a portion of their order and remain in the marketplace for the remainder of their order while the seller transacts their entire order and is removed from the marketplace and vice versa.

In another aspect of the computer implemented continuous dual auction system, various real-time, or substantially real-time, online marketplaces may be created within the host website. For example, one database may be for the sale of concert tickets, one database may be for the sale of goods such as used furniture, electronics, etc., and yet another database may be for the sale of services such as carpet cleaning, etc. Where certain items, such as an event ticket, may include hundreds of items, such marketplaces and related databases may be further separated into more specific marketplaces, such as the section in which the tickets are located in a particular venue. Because some of these items may have a time limit attached to them, for example the sale of event tickets, such marketplaces may have an end time that matches or is near the start time of the event ticket. For example, the continuous dual auction marketplace for the sale of certain theatre tickets may close at a certain time that is the same or substantially the same as the starting time of the theatre performance. In another embodiment, the marketplace auction to a particular event can remain open until a specified amount of time passes after the event begins, until the event ends, or there are no more buyers within the auction looking to purchase the event tickets, or there are no more sellers within the auction looking to sell tickets, or both there are no more buyers and sellers in the marketplace, or any other way of closing the auction. Another aspect of the various continuous dual auction system marketplaces may be the ability to support the sale and purchase of both paper tickets as well as electronic tickets to events, like a football game.

In another aspect of the system, bids and offers are funded or backed, respectively, by a system guaranty. In order for a user to post a bid or an offer, for example, the user must enter or have entered valid credit card information or setup a funded user account. One advantage of the guaranty is to compensate buyers who fail to receive the purchased item due to the seller's failure in transferring the correctly purchased item to the buyer. Another advantage of the guaranty is to compensate sellers who fail to receive the proceeds from the item sold due to the buyer's failure in transferring funds to the seller. Yet another advantage of the guaranty is to eliminate buyers from trying to raise the price of certain items where the buyer has no intention of actually buying.

In another aspect of the system, the execution of a sale is dependent on the amounts of the bids and offers rather than on the date or time in which the user posts a bid or offer to the various online marketplaces in the system, unless the bid or offer amount is the same, in which case the bids and offers are prioritized by the date of entry in the system. An advantage of this system is that it allows the users, buyers and sellers, to immediately see the market rate for a given item rather than search through various postings based on dates to get an idea of what the market is for a certain item.

In another aspect of the system, a buyer may select one or more parameters of an item the buyer wishes to purchase. The system allows the buyer to bid on any item that satisfies the buyer's parameters. The system notifies any seller of an item satisfying the buyer's parameters of the buyer's bid.

In another aspect of the system, the fees associated with using the system are automatically deducted from the bids and offers. When a buyer bids on an item, the buyer's bid includes any fees that the buyer has to pay. When a seller receives a buyer's bid, the system notifies the seller of the profit the seller would make by deducting any fees that the buyer pays from the buyer's bid in addition to any fees the seller pays for using the system.

In another aspect of the system, a remote application may be used by buyers and sellers. Instead of accessing the system via a web browser, a remote application may be used to access the system.

The above summary of the various aspects and embodiments is not intended to describe each embodiment or every implementation of the computer implemented continuous dual auction system. Rather, the embodiments are chosen and described so that others skilled in the art may appreciate and understand the principles and practices of the computer implemented continuous dual auction system.

BRIEF DESCRIPTION OF THE DRAWINGS

These, as well as other objects and advantages of the various aspects and embodiments of the computer implemented continuous dual auction system, will be more completely understood and appreciated by referring to the following more detailed description of the various embodiments in conjunction with the accompanying drawings of which:

FIG. 5 is an illustration of one embodiment of a continuous dual auction system's new user login and profile interface.

FIG. 6 is an illustration of one embodiment of a system's credit card information profile page.

FIG. 9 is an illustration of one embodiment of the continuous dual auction system's seller montage.

FIG. 10 is an illustration of another embodiment of the continuous dual auction database system's seller montage.

FIG. 11 is an illustration of one embodiment of a seller's item information profile page.

FIG. 12 is an illustration of one embodiment of a dialog box in which a seller may select a credit card to use for a transaction.

FIG. 16 is an illustration of one embodiment of the continuous dual auction database system's buyer montage.

FIG. 17 is an illustration of another embodiment of the continuous dual auction database system's buyer montage.

FIG. 18 is an illustration of one embodiment of a buyer's item information profile page.

FIG. 19 is an illustration of one embodiment of a dialog box in which a buyer may select a credit card to use for a transaction.

FIG. 22 is an illustration of one embodiment of an interface for entering an offer for an item.

FIG. 23 is an illustration of one embodiment of an interface for modifying an offer for an item.

FIG. 24 is an illustration of one embodiment of an interface showing all active offers for seller's items.

FIG. 25 is an illustration of one embodiment of an interface for entering a bid for an item.

FIG. 26 is an illustration of one embodiment of an interface for modifying a bid for an item.

FIG. 27 is an illustration of one embodiment of an interface showing all active bids for the buyer.

FIG. 29 is an illustration of one embodiment of an interface showing the results of a user's search.

FIG. 36 is an illustration of an example item listing of a remote system.

FIG. 38 is an illustration of an example item listing of a remote system showing a new bid alert.

FIG. 39 is an illustration of an example item listing of a remote system showing a new offer alert.

FIG. 40 is an illustration of an example item listing of a remote system showing a new buy negotiation alert.

FIG. 41 is an illustration of an example item listing of a remote system showing a new sell negotiation alert.

FIG. 46 is an illustration of a parser component updating users to sales, cancellations and modifications to any order to real-time or substantially real-time.

Figure 1:
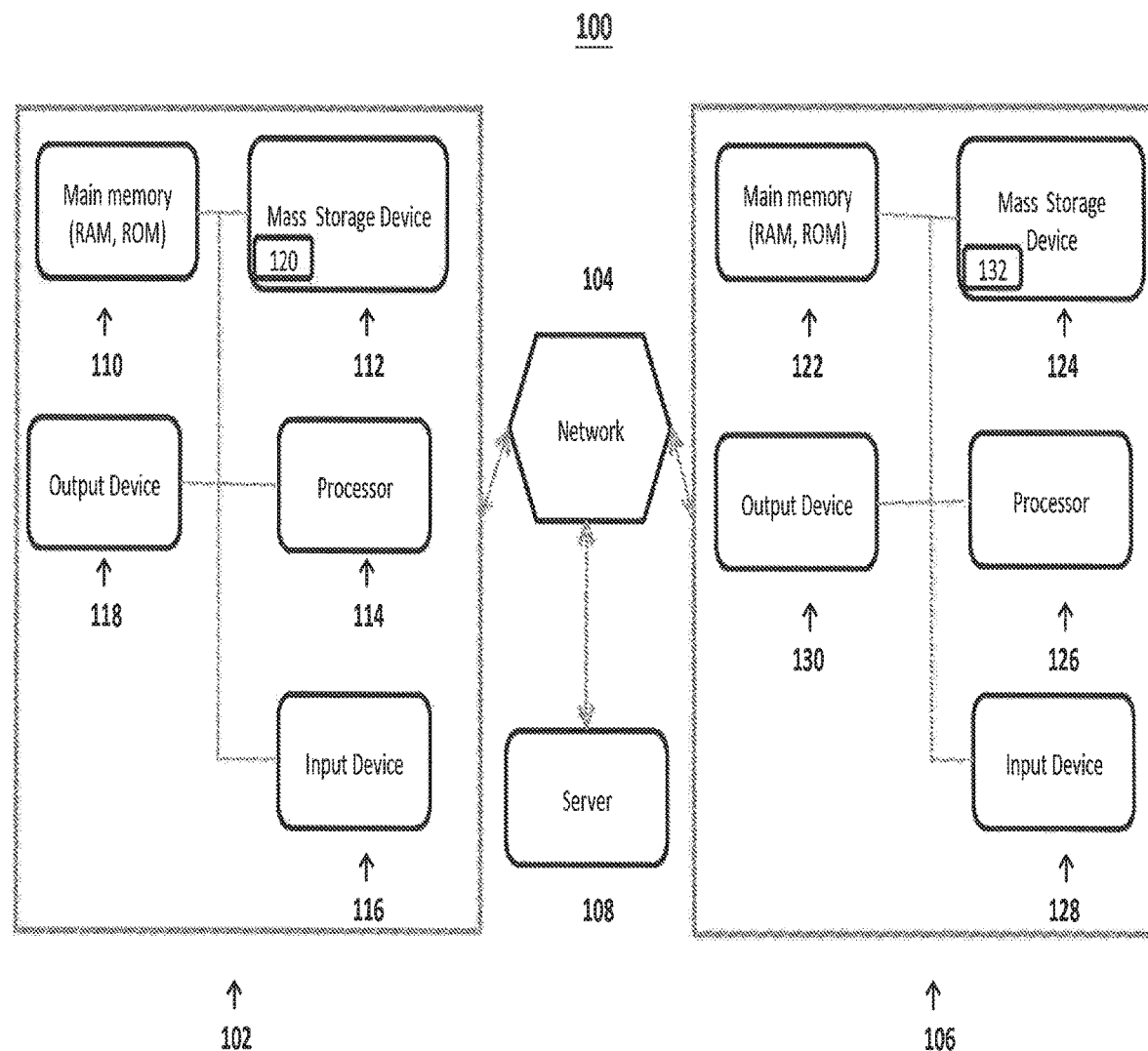
FIG. 1 is a diagram of a general overview of one embodiment of the system.

While the computer implemented continuous dual auction system is amenable to various modifications and alternative forms, specifics thereof have been shown by way of example in the drawings and will be described in detail. It should be understood, however, that the intention is not to limit the computer implemented continuous dual auction system to the particular embodiments described. On the contrary, the computer implemented continuous dual auction system is to cover all modifications, equivalents, and alternatives.

DETAILED DESCRIPTION

The several embodiments as shown in the figures may allow the user of the computer implemented continuous dual auction system to have multiple choices, as there are several choices relating to the many online marketplaces available. Advantages and embodiments of the computer implemented continuous dual auction system are further illustrated by the following examples, but the particular materials and amounts thereof recited in these examples, as well as other conditions and details, are for illustration purposes only and should not be construed to unduly limit.

Overview

FIG. 1 is a diagram of a general overview of one embodiment of the system. A user may enter the computer implemented continuous dual auction system by accessing a website or other interface that interfaces the various online marketplaces, stored databases, and various user information, as well as the various products, services, and items for sale and/or purchase. The website or other interface and the various databases related to the auction system can be stored on a main server which hosts the real-time, or substantially real-time, online marketplaces. A computing device can be used to access the website or other interface. The server can interact with the computing device. A user can access the website or other interface by various means, such as cell phones, a personal computer, a personal digital assistant, and any other device or combination of devices that allows a user to access the Internet and interface with the website.

As shown particularly in FIG. 1, a computing device used with the present disclosure, may be part of a larger network system 100 of devices. System 100 may include one or more computing devices 102 connected through a network 104, such as the Internet. Computing device 102 can interact with a server 106 in order to input and receive information, for example but not limited to, specific event(s) information from user devices in connection with the online marketplaces. The server may be configured to send or receive data to or from user devices as user engages and interacts with the auction system.

System 100 may also include the ability to access one or more webservers 108 in order to obtain content from the Internet for use with the systems and methods described herein. While only one computing device is shown for illustrative purposes, system 100 may include a plurality of computing devices 102 and may be scalable to add or remove computing devices to or from a network.

Computing device 102 illustrates components of an embodiment of a suitable computing device for use with the present disclosure. Computing device 102 may include a main memory 110, one or more mass storage devices 112, a processor 114, one or more input devices 116, and one or more output devices 118. Main memory 110 may include random access memory (RAM), read-only memory (ROM), or similar types of memory. One or more programs or applications 120, such as a web browser, and/or other applications may be stored in one or more data storage devices 112. Programs or applications 120 may be loaded in part or in whole into main memory 110 or processor 114 during execution by processor 114. Mass storage device 112 may include, but is not limited to, a hard disk drive, floppy disk drive, CD-ROM drive, smart drive, flash drive, or other types of non-volatile data storage, a plurality of storage devices, or any combination of storage devices. Processor 114 may execute applications or programs to run systems or methods of the present disclosure, or portions thereof, stored as executable programs or program code in memory 110 or mass storage device 112, or received from the Internet or other network 104, for example, a network connecting the computing devices to the system. Input device 116 may include any device for entering information into computing device 102, such as but not limited to, a microphone, digital camera, video recorder or camcorder, keys, keyboard, mouse, cursor-control device, touch-tone telephone or touch-screen, a plurality of input devices, or any combination of input devices. Output device 118 may include any type of device for presenting information to a user, including but not limited to, a computer monitor or flat-screen display, a printer, and speakers or any device for providing information in audio form, such as a telephone, a plurality of output devices, or any combination of output devices.

Applications 120, such as a web browser, may be used to access the auction system, for example, by connecting to the host server of the server. Any commercial or freeware web browser or other application capable of retrieving content from a network and displaying pages or screens may be used.

A server 106, for example, located at the system manager location, or other server location such as may be employed in a distributed computing network, may also be connected to the network 104. Server 106 may include a main memory 122, one or more mass storage devices 124, a processor 126, one or more input devices 128, and one or more output devices 130. Main memory 122 may include random access memory (RAM), read-only memory (ROM), or similar types of memory. One or more programs or applications 132, such as a web browser and/or other applications, may be stored in one or more mass storage devices 124. Programs or applications 132 may be loaded in part or in whole into main memory 122 or processor 126 during execution by processor 126. Mass storage device 124 may include, but is not limited to, a hard disk drive, floppy disk drive, CD-ROM drive, smart drive, flash drive or other types of non-volatile data storage, a plurality of storage devices, or any combination of storage devices. Processor 126 may execute applications or programs to run systems or methods of the present disclosure, or portions thereof, stored as executable programs or program code in memory 122 or mass storage device 124, or received from the Internet or other network 104. Input device 128 may include any device for entering information into server 106, such as but not limited to, a microphone, digital camera, video recorder or camcorder, keys, keyboard, mouse, cursor-control device, touch-tone telephone or touch-screen, a plurality of input devices, or any combination of input devices. Output device 130 may include any type of device for presenting information to a user, including but not limited to, a computer monitor or flat-screen display, a printer, or speakers or any device for providing information in audio form, such as a telephone, a plurality of output devices, or any combination of output devices.

Server 106 may store a database structure in mass storage device 124, for example in one embodiment, for storing customer feedback information, and other data. Any type of data structure can be used, such as a relational database or an object-oriented database. In general, server 106 may be used to control all aspects of operation of the auction system.

Processors 114, 126 may, alone or in combination, execute one or more applications 120, 132 in order to provide some or all of the functions, or portions thereof, of the auction system and method described herein. Though FIG. 1 only portrays one server, multiple servers may be used.

Furthermore, users of the auction system may be able to access some, any, or all of the features of the auction system using, in addition to the personal computing systems described above, mobile devices, including, but not limited to, smartphones, PDAs, handsets, cell phones, tablet computers, and other known devices with mobile Internet access.

Figure 2:
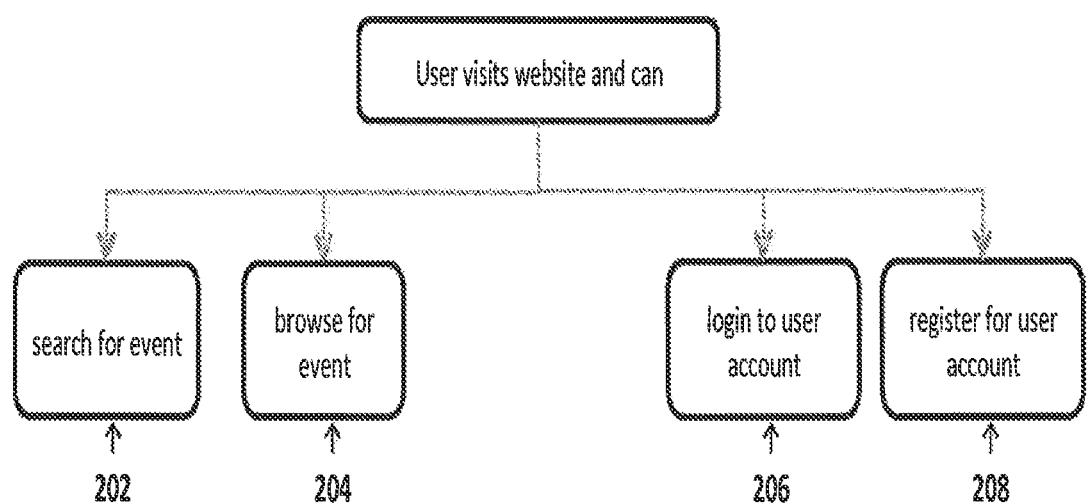
FIG. 2 is a diagram of user options when the user accesses the website or other interface.

As illustrated in FIG. 2, once a user accesses the website or other interface 200, the user can search for an item to purchase or sell 202, browse for an event 204, log into his account 206, or register for an account 208. An item, as used herein, is meant to include any good or service that a user is interested in selling or buying, including but not limited to event tickets, such as sporting events or plays, services, such as rug cleaning, and other goods, such as household or lawn maintenance items, and electronics. A user can search the website or other interface for specific items or search for a specific marketplace to determine if the user would like to participate in an auction. A first-time user may decide to first search for an event before registering, or the user may upon entering the site register as a new user and then go searching the various online marketplaces. Similarly, a returning user can decide to log in immediately upon entering the site or search the various marketplaces before logging in to post a bid for the purchase of an item or an offer for the sale of an item. In one embodiment, the system may remember returning users so that when a returning user enters the website or other interface they are automatically signed in.

Figure 3:
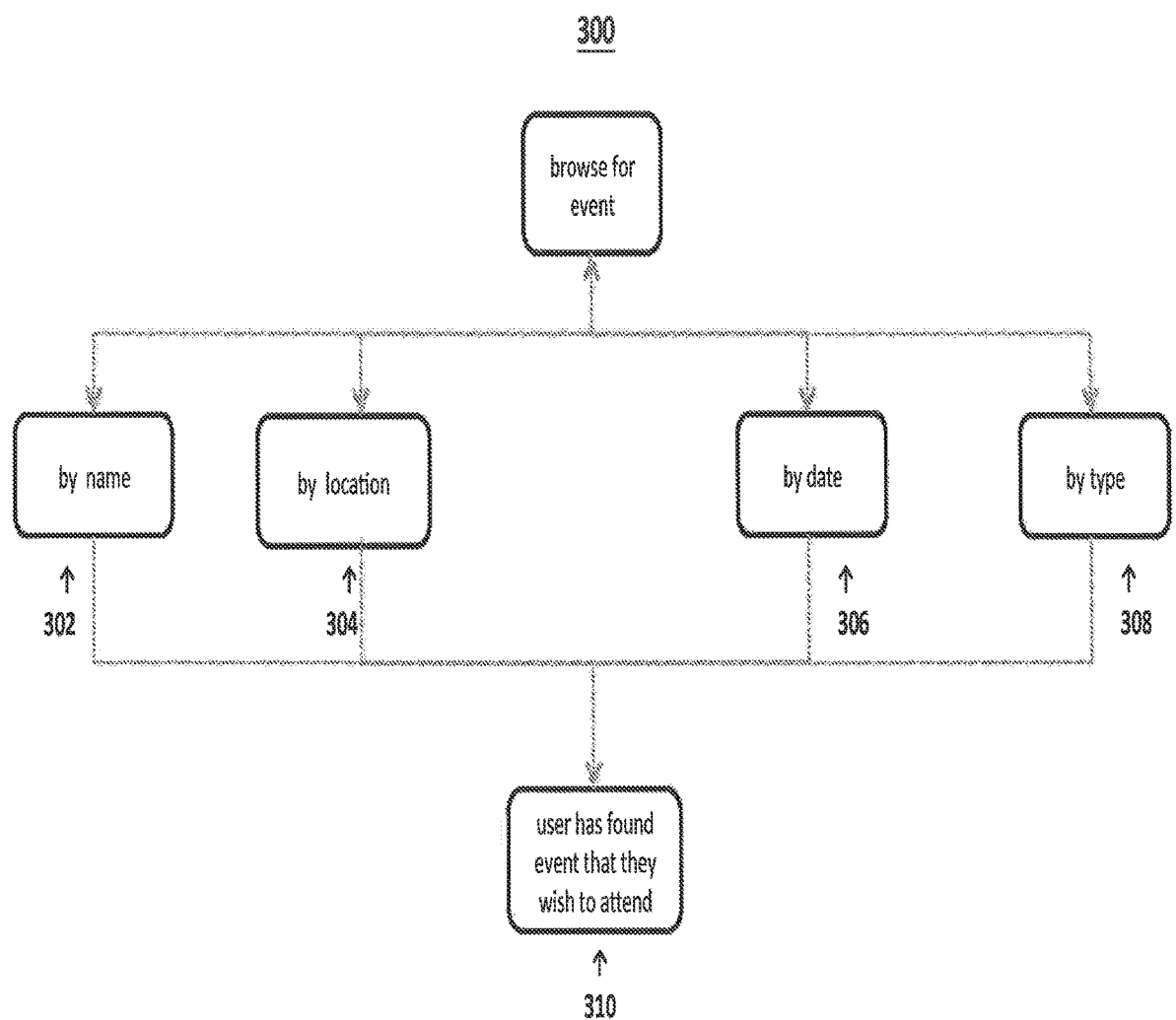
FIG. 3 is a diagram of user options when the user has chosen to look for a certain item.

As illustrated in FIG. 3, in one embodiment of the system where a user has chosen to search for a certain item 300, for example a sporting event, a user can search for the event by the event (or item) name 302, the event location 304, the event date 306, and/or the type of event (or item) 308 to determine the actual event or marketplace the user is interested in selling or buying a ticket to or item from. In another embodiment, a user can search for an item by various combinations of information as well as by other suitable information for identifying the item (or event). Once the user has found the item they were looking for 310, unless further information is required to determine the correct marketplace for the item, the user is directed to the real-time, or substantially real-time, auction marketplace webpage for the event.

Figure 28:
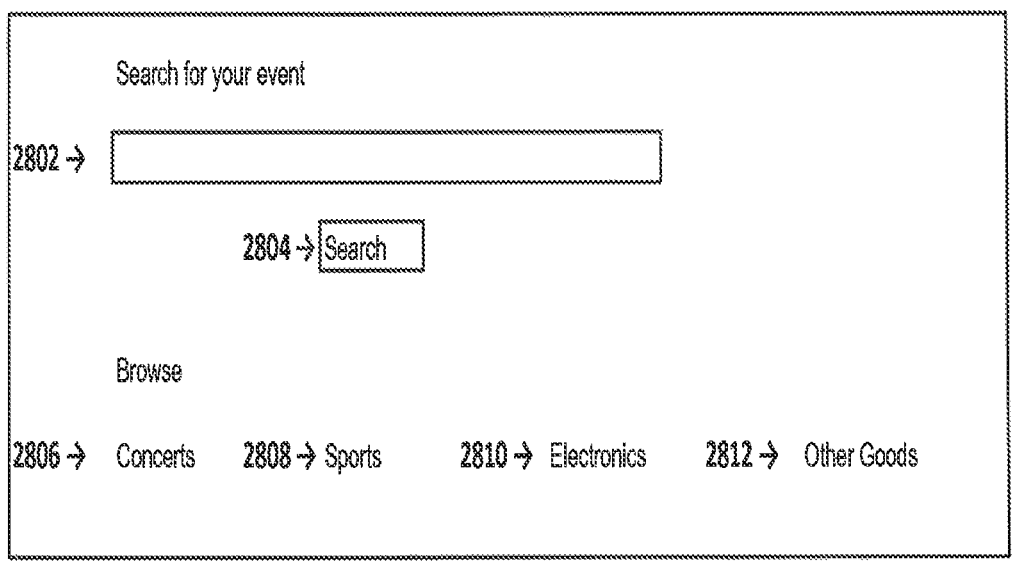
FIG. 28 is an illustration of one embodiment of an initial search interface for a user.

FIG. 28 is an illustration of one embodiment of an initial search interface for a user 2800. In one embodiment, the user may be able to type into a dialog box 2802 the type of item the user is looking for and then click on, for example, a "Search" button 2804 located next to the dialog box 2802. The system may then direct the user to another webpage, open a new webpage, or present the user with another interface, that lists related items or item topics that the user can then click on, as a button or link/hyperlink, which may then direct the user to a more specific topic or the exact item they are looking for. Depending on the item, certain additional information may be requested from the user by which to determine the exact marketplace to direct the user and/or allow the user to post a bid or offer. In another embodiment, where a user is unsure of the exact item they are interested in or would simply like to browse the marketplaces, a user may be able to search for an item by, for example, a broad topic, such as, but not limited to, concerts 2806, sports 2808, electronics 2810, or other goods 2812. This may be accomplished, for example, by clicking on a button next to the topic, clicking on an icon/button containing the topic, or clicking on the words as a link/hyperlink. After clicking on the topic, the user may be directed to another webpage, a dialog box may open, or the user may be presented with another interface listing more specific topics, events or items, wherein a user may further click on those more specific buttons or links and ultimately be directed to a specific online marketplace for an item or items that fit the user's selections. In another embodiment, for example if the item was an event ticket, the user may be asked to provide additional information, like the section of the venue sought before being directed into the online marketplace for that section. As discussed in more detail below, a user may be able to post multiple bids or offers in multiple marketplaces. Once the user has accessed the marketplace and has determined that they would like to enter the marketplace, the user then can, and in some embodiments must, either log in or register in order to proceed with the posting of an offer or a bid.

FIG. 29 is an illustration of one embodiment of an interface showing the results of a user's search 2900. In one embodiment, after searching for "Miami," the events/items column 2902 may be populated with a basketball event 2904, a musical event 2906, a football event 2908, or a television series on CD 2910. In one embodiment for tickets, each event may show the corresponding time of the event and location of the event. In another embodiment for non-tickets, each item may show the condition of the item, completeness of the item, location of the item, or other criteria suited to describe non-ticket items. The user may then choose to become a buyer or seller for a particular event or item by selecting a "buy" button 2912 or "sell" button 2914, respectively. In one embodiment for the basketball event 2904, where a user selects either the "buy" button 2912 or "sell" button 2914, the user may be directed to another webpage, a dialog box may open, or the user may be presented with another interface showing a map of the venue. A seller will who clicks the "sell" button 2914 will be asked to input specific details of the ticket. Once the seller enters this information on the screen then they will be taken to either the sellers montage or the enter new offer screen. The system uses this user-generated information (gate, section, row seat number, event name, event location, event date, event time) and matches it against an already created database of every single seat within the venue. When this information is matched with the database, the system automatically takes the user to the correct market (auction) to which that seller owns the item. This helps prevent fraud and other user generated mistakes.

Figure 30:
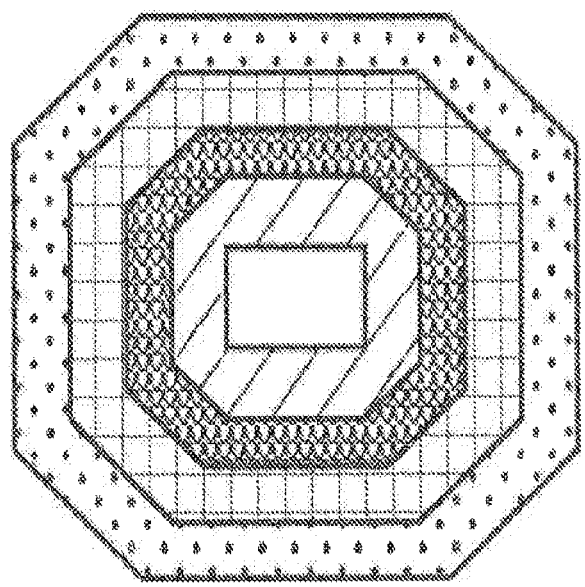
FIG. 30 is an illustration of one embodiment of an interface showing a venue categorized by level.

FIG. 30 is an illustration of one embodiment of an interface showing a venue categorized by level 3000. In one embodiment, where the user selects "Miami Heat v. New York Knicks" as shown in FIG. 29, the venue map for Madison Square Garden 3002 may appear. In one embodiment, the venue may be categorized by lower level 3004, middle level 3006, upper level 3008, and floor level 3010. In another embodiment, the current best offer 3012 or best bid 3014 for each level may be listed depending on whether the user selected to "buy" or "sell," respectively. The user can then choose the appropriate level he or she wants to inquire further about by selecting the appropriate level via the select level column 3016 or clicking on the appropriate level via the venue map 3002. The user may be directed to another webpage, a dialog box may open, or the user may be presented with another interface showing a map of the selected level of the venue.

Figure 31:
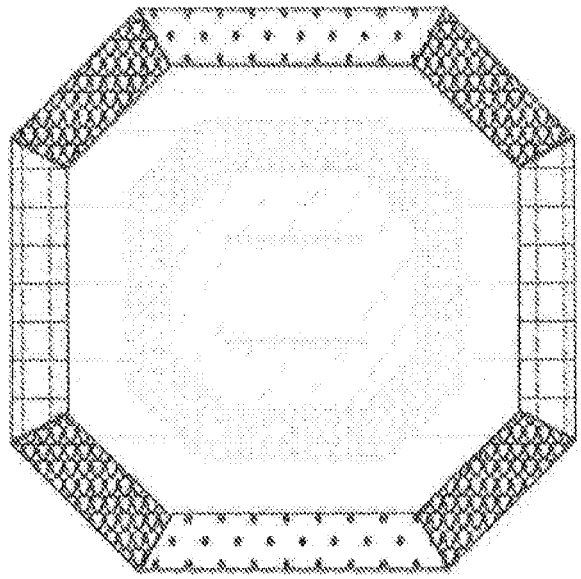
FIG. 31 is an illustration of one embodiment of an interface showing a level categorized by section.

FIG. 31 is an illustration of one embodiment of an interface showing a level categorized by section 3100. In one embodiment, where the user selects "upper level" as shown in FIG. 30, the sections in the upper level category 3102 may appear. In one embodiment, the level may be categorized by multiple sections 3104. In another embodiment, the current best offer 3106 or best bid 3108 for each section may be listed depending on whether the user selected to "buy" or "sell," respectively. The user can then choose the appropriate section he or she wants to inquire further about by selecting the appropriate section via the select sections column 3110 or clicking on the appropriate section via the venue map 3102. The user may be directed to another webpage, a dialog box may open, or the user may be presented with another interface showing a map of the selected section of the level.

Figure 32:
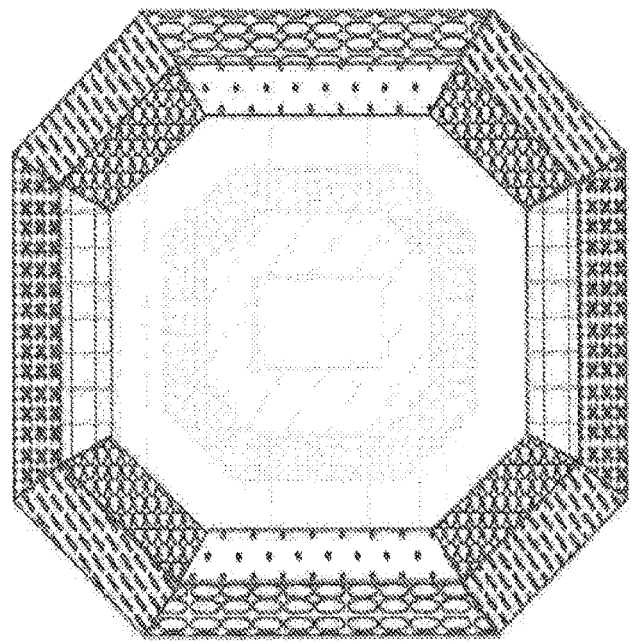
FIG. 32 is an illustration of one embodiment of an interface showing a section categorized by groups of rows.

FIG. 32 is an illustration of one embodiment of an interface showing a section categorized by groups of rows 3200. In one embodiment, where the user selects a section as shown in FIG. 31, the groups of rows in the chosen section 3202 may appear. In another embodiment, where the user selects "upper level" as shown in FIG. 30, the groups of rows in the chosen level 3202 may appear. In one embodiment, the section or level may be categorized by multiple groups of rows 3204. In another embodiment, the current best offer 3206 or best bid 3208 for each group of rows may be listed depending on whether the user selected to "buy" or "sell," respectively. If the user is a buyer, the user can choose to view tickets 3210 in order to view all offers for a particular group of rows. If the user is a seller, the user can choose to view tickets 3212 in order to view all bids for a particular group of rows. The user may be directed to another webpage, a dialog box may open, or the user may be presented with another interface showing all tickets.

Figure 4:
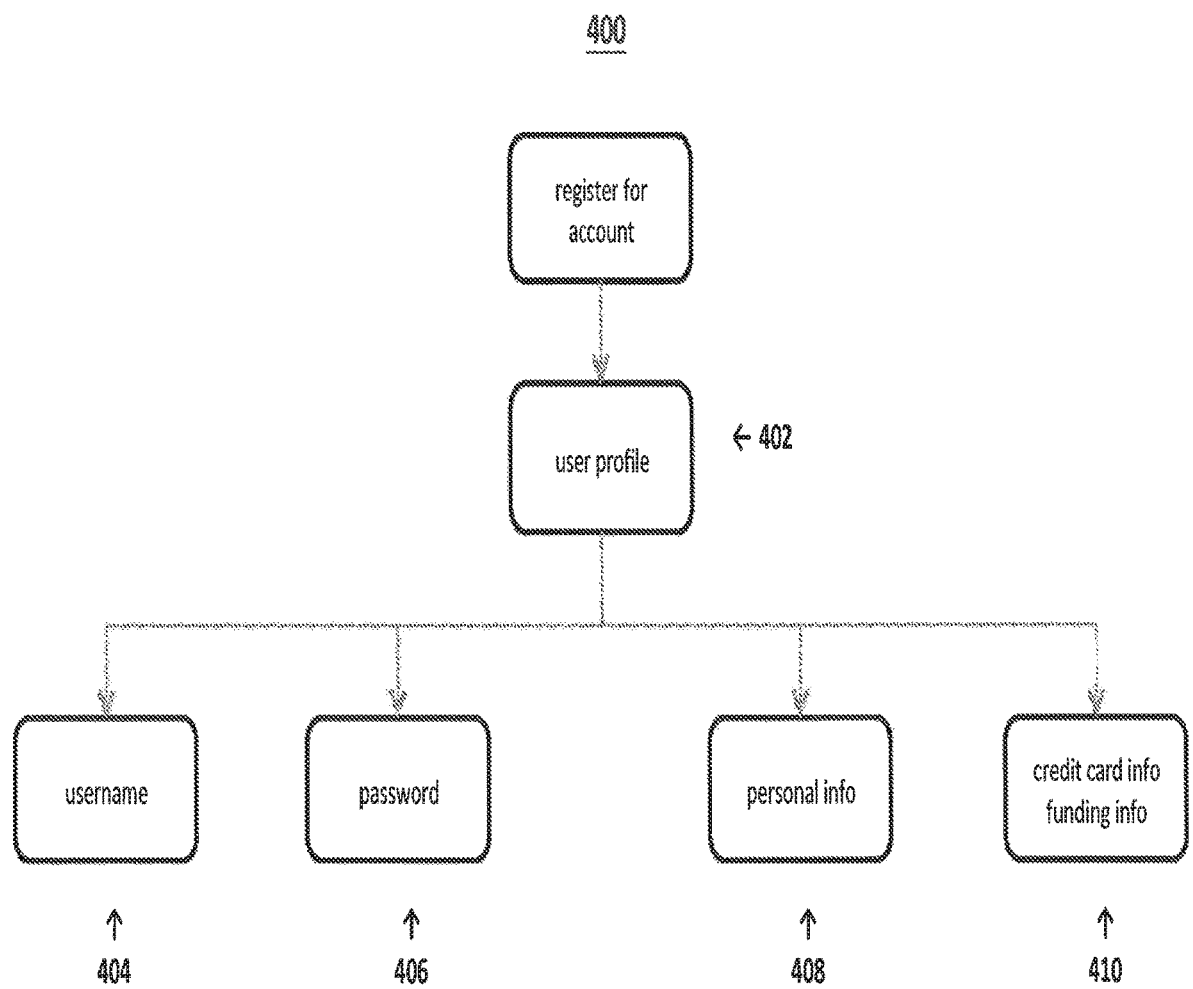
FIG. 4 is a diagram of user options when the user has chosen to register for an account.

As illustrated in FIG. 4, in one embodiment of the system where a user has chosen to register for an account 400, the user can setup an account profile 402. The profile 402 can include creating a username 404 and password 406. The account profile can also include the user's personal information 408, such as address and phone numbers, as well as the user's payment information 410, such as credit card information.

FIG. 5 is an illustration of one embodiment of a continuous dual auction system's new user login and profile interface 500. As shown, the user can create a username 502 and password 504, as well as enter or be required to enter a valid email address 508. To verify the password, the user may have to re-enter the password 506. The user may also be asked or required to enter certain other personal information such as the user's title 510, first name 512, middle name or initial 514, last name 516, street address 518, city 520, state 522, zip code 524, daytime phone number 526, evening phone number 528, mobile phone number 530, or any combination thereof. A user may enter this information in any number of ways. For example, a user may directly type the information into the relevant space, there may be a drop down box in which the user can select from, or any other way in which to enter data into the system or any combination thereof. Instead of a separate webpage, this may be a pop-up box or another interface presented to the user.

In one embodiment, a user may then be required to choose to agree with a user license agreement or other use agreement or terms of service 532. There may be a clickable link or button that will allow the user to view and read the agreement before agreeing to the terms of the agreement. A user can agree by clicking in a small dialog box that places a checkmark in the box indicating agreement, or some other way to signify acceptance of the agreement. If the user declines to accept the terms of the user agreement by either entering no, failing to click in the dialog box, or otherwise signifying non-acceptance of the license agreement, in some embodiments, the user may not be able to continue with use of the system. In other embodiments, the failure to agree to the agreement may only prevent a user from being able to participate in an auction, wherein the user may be able to search for and view the various marketplaces.

In another embodiment, the user profile may include a promotional preference, wherein a user may agree to receive information regarding upcoming events and promotions 534. A user may signify acceptance or non-acceptance of future information by either typing in yes or no, choosing one from a drop down box, or otherwise signifying the same. In another embodiment, the user may agree to receive certain emails or alerts relating to certain services a user may be interested in purchasing or selling when they come into a marketplace.

In another embodiment, the user profile can include specific bid or offer alerts, wherein a user may be able to indicate whether the user would like an email notice or other electronic alert, such as a text message, to be sent if an offer is within a certain range of a bid, or vice versa. The user may be able to modify this information as well. An example of the alert may be a price drop in percentage or dollar amount.

In one embodiment, the profile page may include the ability for the user to input the user's credit card information upon registering. In another embodiment, the user may enter the credit card information upon the posting of a bid or an offer in a marketplace. In another embodiment, the user may have the option of using a stored credit card or entering a new credit card for the funding or backing of a certain bid or offer, respectively.

One advantage of requiring credit card information is its potential use in creating a guaranty, wherein a user may be required to provide valid credit card information to fund a bid for the purchase of an item or back an offer to sell an item. For instance, where the user is a seller of an event ticket and the user fails to forward the ticket to a buyer, the credit card information could be subjected to a withdrawal in an amount to compensate the buyer for the loss of the ticket, as well as any other applicable fees or charges of the auction system due to such failure. In one embodiment, the guaranty may be a guaranty of increased value, such as but not limited to a 125% guaranty, a 150% guaranty, a 200% guaranty, or any other suitable increased value guaranty or return to the buyer wherein the buyer receives back an amount greater than what they paid/bid when the item purchased fails to be transferred from the seller to the buyer due to, for example but not limited to, the seller's negligence or fraudulent behavior. In one embodiment, the guaranty may be less than 125% or more than 200%. In one embodiment, the guaranty may change based on the type of marketplace. For instance, the guaranty may increase with the value of the item being bought/sold within a certain marketplace, and vice versa.

In another embodiment, the profile page may include an alternative option where the user does not have or does not want to use a credit card to fund or back the bid or offer. For example, the user may be able to create an account wherein the user may be able to submit funds to the account to be used to fund or back the posting of a bid or offer. In one embodiment, the user may be able to send a check to a system operator wherein after the check clears the account is credited with the funds. In another embodiment, the user may be able to electronically transfer funds from one account, such as a checking or savings account, to the system account to be used in posting a bid or offer. In a further embodiment, a user may have a funded account, as well as saved credit card information, and the ability to be specific by what means the user would like to fund or back a bid or offer. In another embodiment, a user may be able to create more than one account. In another embodiment, a user may also be able to use other methods to fund or back a bid or offer, such as PayPal accounts and the like.

In a further embodiment, the profile page may allow the user to select a specific account or credit card as a default, wherein the selected account or credit card will be used as the default account upon the posting of any bid or offer until or unless the user or other authorized person elects to change this setting in the profile page. Alternatively or additionally, the user may elect to have the system verify which account or credit card a user would like to use each time the user posts a bid or offer.

In one embodiment, the log in and/or profile page may include one or more security questions. For example, the user may be asked to pick from a variety of questions and then in a space provided, for example a dialog box, input the answer to that particular question. In one embodiment, the user may need to pick more than one security question and input the answers to the particular questions picked. An advantage of security questions is to provide additional security through the log in and verification process to help ensure the person logging into the account is either the actual user or is an authorized user. In one embodiment, the user may have to answer one, all, or a combination of different security questions each time the user logs into the system. In another embodiment, the system may randomly pick which question or questions will be asked. Additionally, the security questions can provide a way for a user, or authorized person, to recover a username and/or password. If a user forgets, for instance, their username or password, the system through the use of security questions can provide the user with recovery of the username and password. In one embodiment, the system may require that the user create a new password where the user has forgotten, for instance, the previous password. This can provide added security in case the user wrote the username and password on a piece of paper, which is missing, for example, someone else has taken it for unauthorized entry into the system.

One embodiment of the profile page may include the ability for a user to review the user's complete site history, including all or some of the transactions the user has made within the system. For example, a user may be able to view any, all, or certain: bids and/or offers; modifications to bids or offers; cancelations of offers and/or bids; modifications in the quantity of a given item's bid or offer; and/or executed transactions. One advantage is that if the user does not want to keep or maintain a separate record or misplaces/loses/damages the separate record, the user can review their transactional history on the site by logging into their profile page. In one embodiment, after a user logs into the system there may be a link or the user may be presented with another interface, for example labeled "Transaction History" or other suitable identifier, wherein the user can click on this link to view all or some of the transactions that have taken place. The link may open up a dialog box, a new webpage, and/or direct the user to a different webpage. In one embodiment, the user may be able to indicate what type of transactions they are interested in viewing, the date range for such transactions, the type of item, or other filtering information, or any combination thereof. A user may be able to print out or save this information to a different device. In another embodiment, the user may be able to view other relevant information, such as the money spent within the site, the amount of income received from sales, etc.

FIG. 6 is an illustration of one embodiment of a system's credit card information profile page 600. A user can input the type of credit card 602, the credit card number 604, the expiration of the credit card 606, the security code for the credit card 608, the first name shown on the credit card 610, the middle initial or name shown if shown on the card 612, the last name shown on the credit card 614, the billing street address 616, country 618, city 620, state 622, zip code 624, phone number 626 and/or email address 628. A user may enter this information in any number of ways. For example, a user may directly type the information into the relevant space, there may be a drop down box in which the user can select from, or any other way in which to enter data into the system or any combination thereof.

Figure 7:
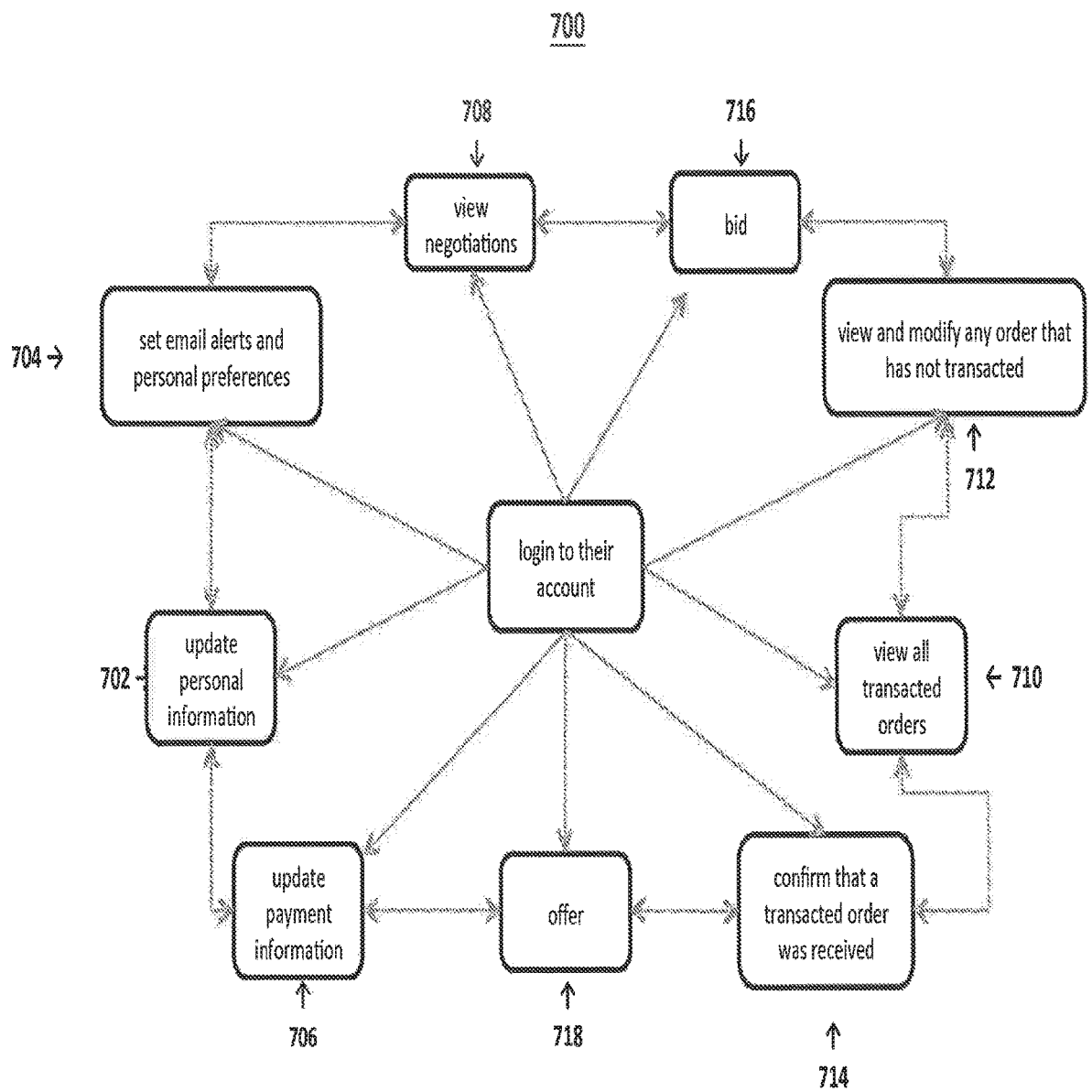
FIG. 7 is a diagram of one embodiment of the system, where a user has chosen to log into their account, showing the user has the option to do several things.

As illustrated in FIG. 7, in one embodiment of the system where a user has chosen to log into their account 700, the user can do several things. For instance, a user can update any personal information 702, such as their address or phone number, or set email alerts or personal preferences 704, and/or update payment information 706, such as modify, delete, or add credit card information. A user can also choose to view all or some of the negotiations 708, view all or some of the transacted orders 710, view and modify any order that has not transacted 712, as well as confirm that a transacted order was received 714. Additionally, a user can choose to enter a bid 716 for the purchase of a good or service, or enter an offer 718 for the sale of a good or service.

Seller

Figure 8:
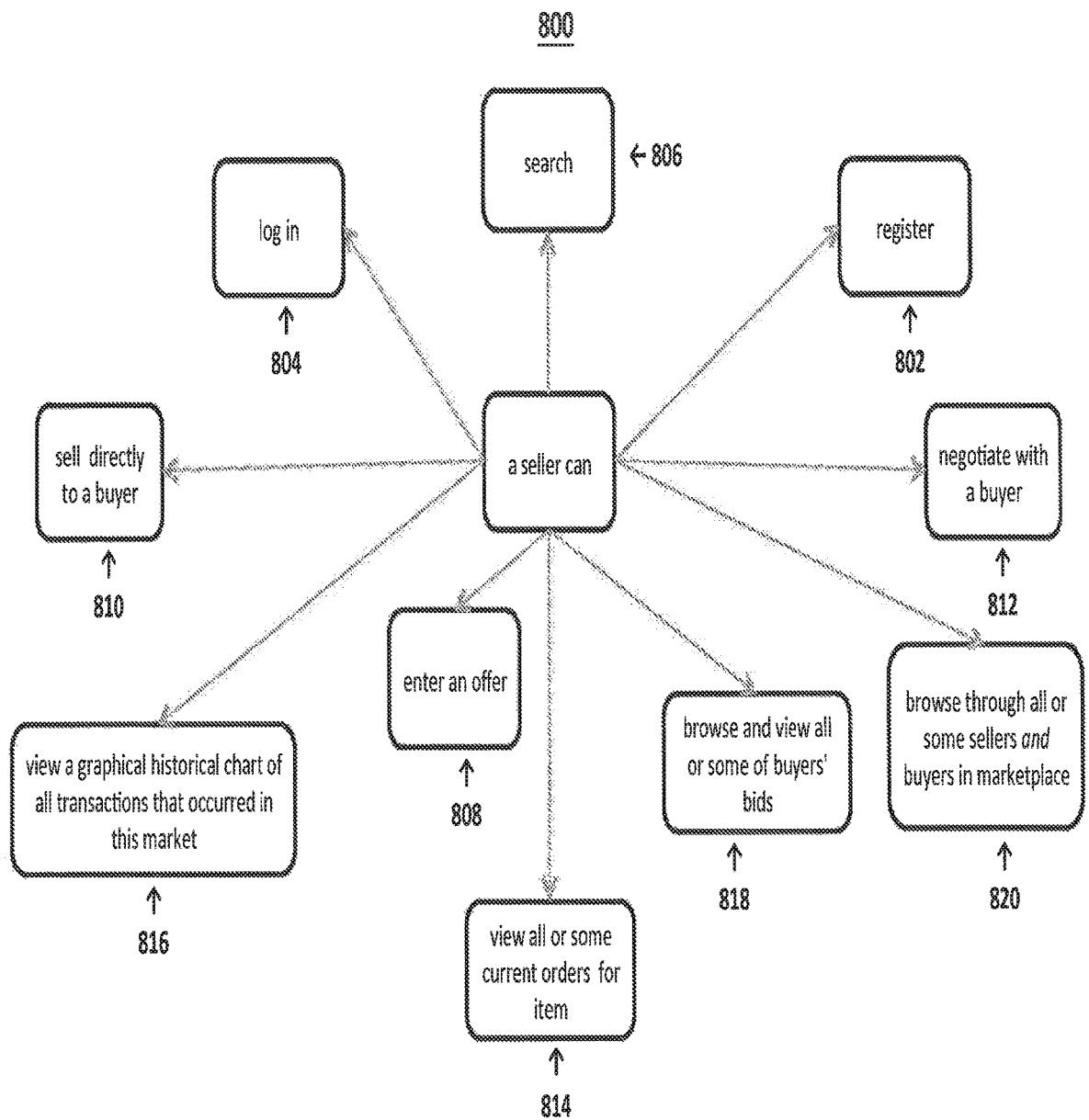
FIG. 8 is a diagram of one embodiment of a seller's options, where the user becomes a seller for the purposes of selling an item through the online marketplace auction.

FIG. 8 is a diagram of one embodiment of a seller's options 800, where the user becomes a seller for the purposes of selling an item—a good or service—through the online marketplace auction. If the seller is a first time user, the seller can register 802 with the system and create an account and online profile. If the seller is a returning user, the seller can log in 804 to their account. If a seller is not a returning user, the seller may be asked to register by creating a username and/or password. In one embodiment, the seller can search 806 the various databases or online marketplaces for the appropriate auction in which to sell their good or service. After a seller has registered and/or logged in and entered a marketplace, a seller can enter an offer 808 for an item they would like to sell. If a seller has posted an offer and no longer wants to wait for an automatic execution of a sale, the seller can sell the item directly to a buyer 810 and/or negotiate directly with a buyer 812 regarding the sale of that item. The seller can also view all or some of the current orders for this item 814, as well as view a graphical historical chart 816 of all or some of the transactions that have occurred in this market. An order for an item can be either a bid or an offer. A seller will only be allowed to enter one posted offer per item they have to sell. A seller can also browse and view all or some of the buyers' bids 818, as well as browse all or some of the buyers and sellers in the marketplace 820.

FIG. 9 is an illustration of one embodiment of the continuous dual auction system's seller montage 900. In one embodiment, the seller may be directed to a real-time, or substantially real-time, online auction database system webpage that shows a current bids database 902, a most recent transactions database 904, a current best bid and offer database 906, a current offers database 908, a seller's toolbox 910, and/or a graphical chart 912. In another embodiment, the webpage may also include the date and/or time the auction will end 914. In a further embodiment, the webpage may include links to additional information, such as news 916, charts 918, weather 920, other marketplace auctions that are similar to the specific item being sold 922, and/or other marketplace auctions that are similar to the general item being sold 924. In one embodiment of the invention, an auction similar to the specific item can be, for example, in the case of a concert, different sections or seats within the same event. In another embodiment, an auction similar to the specific item can be, for example, in the case of a concert, different concert tickets for the same artist. In one embodiment of the invention, an auction similar to the general item can be an item, for example, in the case of a concert, different concert tickets for different artists. Additional links, buttons, information, or other suitable alternatives may be added or deleted depending on the type of item being sold, for example, whether it is a good or service. In one embodiment, where the item is a service, a link may be included that would describe in detail the service and what is included or not included, the possibility of modifying the service to include more or less of the services, etc.

In one embodiment, the seller's toolbox 910 may provide the seller with various options in modifying the seller's offer. One option may allow the seller to modify the posted offer by a certain dollar amount. In one embodiment, a posted offer, as used herein, is meant to include the highest amount a seller desires to sell an item at, which amount is visible to all others in the marketplace. In another embodiment, a posted offer, as used herein, is meant to include the lowest amount a seller desires to sell an item at, which amount is visible to all others in the marketplace. A seller may have the option to modify the posted offer at any time by a certain dollar amount by clicking a button, for example, the "Ask–$20" button 926, wherein the seller's posted offer amount may be automatically modified by the amount specified on the button. For example, the button "Ask–$20" may decrease the seller's posted offer by twenty dollars ($20). In one embodiment of the system, offers can be modified by whole dollar amounts eliminating or reducing worthless offer modifications. In one embodiment, the offer can be modified within certain dollar amount increments, which incremental amounts may be different based on the item and/or price of the item being auctioned. Another advantage of the automatic amount modification may be to prevent untrue offers. In one definition of an untrue offer, the seller enters an offer into the system and ends up not sending the item to the buyer after a transaction either because the seller (1) never had an intention to sell the item when the offer was placed or (2) developed the intention not to sell the item after the offer was placed. In another definition of an untrue offer, the buyer has an item the buyer wants to purchase and wants to artificially deflate the perceived demand for the item in the current offers database 902/1002. The buyer then places at least one offer for the item, never intending to actually sell the item, but rather to fool users into thinking that the market offer rate is lower for the item than it actually is.

In another embodiment, an offer can be modified in increments of a dollar. In one embodiment, the amount of the increments may be dependent on the value of the item in the marketplace. In one embodiment, an offer can be modified by using the keyboard or other input device in manipulating the amount of the offer.

In one embodiment, another toolbox 910 option may be to sell an item at the current market price listed in the real-time, or substantially real-time, auction database 902. A seller wishing to sell before their posted offer is lifted or otherwise desires to affect a sale quicker may sell at the then-currently highest published bid, creating a market sale. Lifted, as the term is used herein, is meant to include when a buyer enters the marketplace by posting a bid, or modifying a previous bid so that the buyer's bid equals the seller's posted offer. In one embodiment, to execute a market sale, the seller may click on a button indicating a market sale, for example a "Sell Mkt" button 928 in the seller's toolbox 910. In one embodiment, the quantity field 932 may expand and/or may be automatically populated with the quantity of tickets the buyer is willing to purchase at that price. The seller may complete the transaction by clicking on a button, for example, on the "Submit" or "Continue" button 934. After the seller clicks on the button 934, for example, the system may direct the user to another dialog box, webpage, or present the user with another interface to verify that the seller wishes to proceed with this transaction. This may protect against the seller inadvertently affecting a market sale where the seller accidentally clicks on the button 934. This may also provide the seller with a chance to review the information including the item(s) being sold, the price, and the buyer before executing the sale. In one embodiment, the item(s) purchased may then be removed from the real-time, or substantially real-time, auction database 902. The seller's offer and the buyer's bid relating to this sale may be removed from the real-time, or substantially real-time, auction database 902. In another embodiment, the latest transaction database 904 may then be updated with the most recent sale. In another embodiment, the chart 912 will update as well, wherein the chart is a graphical representation of the transaction database.

In one embodiment, another option of the toolbox 910 may be for the seller to be able to modify their offer to become the best offer in the marketplace with a single click, as the case may be. In one embodiment, a seller wishing to modify their offer wherein their offer becomes the new best offer in the marketplace, the seller may be able to click on a button, for example a "Best Ask" button 930, which would automatically modify the seller's offer making it the best offer in the marketplace. In one embodiment, the seller's offer will be modified by the incremental dollar amount already specified in relation to the specific marketplace. In another embodiment, the seller may be able to indicate by what incremental dollar amount the seller would like their new offer to be the best offer by. In another embodiment, the seller may be able to enter into the system the exact price the seller wants to modify his or her offer to.

In one embodiment, another option available to the seller in the seller's toolbox 910 may be for the seller to modify the amount of the item, such as the amount of tickets or the multiple of tickets, the seller is selling. In one embodiment, the seller may click on a button, for example a "Quantity" or "Inc. Qty x #" button 932, wherein once the seller clicks on the button a dialog box may open, the seller may be directed to a new webpage, or the seller may be presented with another interface, wherein the seller can modify the number of items, for example, tickets being offered for sale. In another embodiment, the seller may also be able to modify the multiple of items, such as tickets, the seller is willing to sell.

FIG. 10 is an illustration of another embodiment of the continuous dual auction database system's seller montage 1000. In one embodiment, the seller can be directed to a real-time, or substantially real-time, auction database webpage showing the current offers database 1002, the most recent transactions database 1004, the current best bid and offer database 1006, a current bids database 1008, a seller's toolbox 1010, and/or a graphical chart 1012. In another embodiment, the webpage may also include the date and/or time the auction will end 1014. In a further embodiment, the webpage may include links to additional information, such as news 1016, charts 1018, weather 1020, other marketplace auctions that are similar to the specific item being sold 1022, and/or other marketplace auctions that are similar to the general item being sold 1024. In one embodiment of the invention, an auction similar to the specific item can be an item within the same auction; for example, in the case of a concert, different sections or seats within the same event. In another embodiment, an auction similar to the specific item can be other items related to the same auction; for example, in the case of a concert, different concert tickets for the same artist. In one embodiment of the invention, an auction similar to the general item can be an item not within the same auction; for example, in the case of a concert, different concert tickets for different artists. Additional links, buttons, information, or other suitable alternatives may be added or deleted depending on the type of item being sold, for example, whether it is a good or service. In one embodiment, where the item is a service, a link may be included that would describe in detail the service and what is included or not included, the possibility of modifying the service to include more or less of the services, etc.

In a further embodiment, the current offers database 1002 may provide the seller with additional functionality in modifying their offer. In one embodiment, the database 1002 may have a column entitled "Multiple" 1026, for example, wherein the number of the item being sold is listed in the column. For instance, a seller may be selling an item in which he has a quantity of 10 and wishes to sell them in pairs or other increments, thus alerting buyers as to what as well as how many of an item is being offered for sale. In another embodiment, there may also be a column entitled "Quantity" (not shown on the figure), wherein the seller can enter the number of items he has and/or wishes to sell. In another embodiment, the column would also include a way for the seller to modify the number of the items being sold by either clicking on a down arrow type of a button, for example, or other way in allowing the seller to easily modify the number of the items being sold.

In one embodiment, the database 1002 may include a column entitled "Sell Now" 1028, for example. This column may be a button or link wherein if the seller presses or clicks on the "Sell Now" button or link associated with the bid the seller is interested in (these may be in the same row), a sale may execute. In one embodiment, after the seller clicks, for example, on the "Sell Now" button, another webpage, dialog box, or other interface may open in which the seller has the chance to review the sale before completing the transaction. This may also act as a safety to verify the seller wanted to make this sale and did not accidently click on the button.

In one embodiment of the invention, when the seller clicks "Sell Now" 1028, the system will allow the seller to select the bid with multiple 1026 the seller wishes to sell. In another embodiment, the buyer may be bidding in a smaller multiple 1026 than the seller wishes to sell; in this case, the seller has to choose another bid that has the multiple 1026 the seller desires. In another embodiment, if the buyer is bidding in a smaller multiple 1026 than the seller wishes to sell, the system will allow the seller to select negotiate 1030 and inquire if the buyer is willing to purchase the item in the seller's desired multiple 1026.

In another embodiment, the bids can be sorted by clicking on a "sort bids by" 1034 down arrow type of a button and selecting criterion such as bid price, quantity, multiple, row ranges, aisle seats only, item needed by date, or item color.

In one embodiment, the database 1002 may have a column entitled "Negotiate" 1030, for example. This column may be a button or link where the seller presses or clicks on the "Negotiate" button or link associated with the bid the seller is interested in (these may be in the same row) and a negotiation notification and/or alert may be sent to the intended buyer. In one embodiment, after the seller clicks, for example, on the "Negotiate" button, another webpage, dialog box, or other interface may open in which the seller may begin negotiations with a buyer for the sale of an item. How a negotiation works or may be done is explained in more detail below with respect to FIG. 14.

In one embodiment, the seller's montage 1000 may have a button entitled "Enter New Offer" 1032, for example. This button or link may allow the seller to enter a new offer into the database 1002. In one embodiment, a new dialog window may open wherein the seller will be able to input the relevant information in order to post an offer into the marketplace. In one embodiment, the user may be directed to a new webpage wherein the seller would input the requested information required to post an offer within the marketplace.

FIG. 11 is an illustration of one embodiment of a seller's item information profile page 1100. In one embodiment, where a seller may initiate the posting of an offer, a dialog box may open, the seller may be directed to a new webpage, or the seller may be presented with another interface where the seller may be prompted to enter certain information related to the item being sold. For example, if the item was an event ticket, such information as the event name 1102, date 1104, time 1106, venue 1108, section 1110, row 1112, seats 1114, and/or whether there is an obstructed view 1116 may be entered into the system. A seller may enter this information in any number of ways. For example, a seller may directly type the information into the relevant spaces, there may be a drop down box from which the seller can select information, or any other way in which to enter data into the system or any combination thereof.

In one embodiment, a link may pull up a map of the venue in which the seller may be able to click within a certain section of the venue map and these entries will be automatically populated with this information. Depending on the item being sold, a seller may be required to enter some or all of this information, i.e., some of the information may be optional. What information a seller may enter may be dependent on what is being sold by the seller, wherein additional or different information may be required or optional for the seller to enter.

The seller may also input the proxy offer 1118, the posted offer 1120, the quantity of tickets being sold 1122, and in what multiple 1124 the tickets may be sold if the seller has more than one. The proxy offer 1118, as used herein, is meant to include the lowest amount a seller is willing to sell an item for, which amount is not visible to others in the marketplace. How a proxy offer 1118 works is explained in more detail in FIG. 20 below. A seller may enter this information in any number of ways. For example, a seller may directly type the information into the relevant space, there may be a drop down box in which the seller can select from, or any other way in which to enter data into the system or any combination thereof. Instead of a separate webpage, this may be a pop-up box or other interface presented to the user. The seller may click a button, for example, a "Continue" button 1126, wherein the seller may choose the means in which the seller would like to back the offer. For example, the seller may choose to back the offer by using the seller's system account, which may have been funded by the seller's own funds, a saved credit card, or enter a new or different credit card to proceed with the posting of the offer in the marketplace auction.

FIG. 12 is an illustration of one embodiment of a dialog box in which a seller may select a credit card to use for a transaction 1200. The seller may select to use the credit card information already stored in the seller's account profile, or, if there is more than one credit card stored, the seller may choose the credit card they would like to use for the transaction, or the seller may enter credit card information into the system for the purpose of this transaction. If a seller has multiple credit cards on file, at the top of the dialog box, for instance in one embodiment, the seller may be able to choose which credit card they would like to use, for example, from a drop down box 1202 or other means. The seller may be required to enter the security code 1204 associated with the chosen credit card and/or the seller's email address 1206, for verification purposes. If the seller does not have or does not want to use a saved or new credit card, the seller may choose to use the seller's system account instead. If the seller has more than one account, the seller may be able select which account the seller would like to use to back the offer being posted.

If the seller would like to use a new and/or different credit card for the transaction, the seller may input the type of credit card 1208, the credit card number 1210, the expiration of the credit card 1212, the security code for the credit card 1214, the first name shown on the credit card 1216, the middle initial or name shown if shown on the card 1218, the last name shown on the credit card 1220, the billing street address 1222, country 1224, city 1226, state 1228, zip code 1230, phone number 1232 and/or email address 1234. Some information that a seller may input may be required and some information may be optional. After the seller inputs this information, the seller may click on a button to continue, such as a button labeled "Continue" 1236. The seller may be asked by the system if the seller would like to save this credit card information in the system. This may be accomplished in any number of ways, for example in one embodiment a pop-up, dialog box may appear after a seller clicks the "Continue" button 1236. If the seller wishes to save the credit card, they may be asked to name the card for later recognition. If not, in one embodiment or an alternative embodiment, the credit card information may remain in the system for only the duration of the auction in which the seller has the offer listed, which offer includes this particular credit card information. For purposes of a seller's offer, in some embodiments, the credit card may not be used except for guaranty purposes. If a seller does not complete a sale by the time the auction ends, the credit card information may be deleted from the system. In another embodiment, the credit card information may remain in the system as part of the user history.

After the credit card information is entered into the system and confirmed, or the account is verified to contain sufficient funds, the auction database system may upload the item information being sold into the related event-specific real-time, or substantially real-time, auction system database and marketplace, as noted above with respect to FIG. 9. The seller may be brought into the online auction marketplace and may be able to see all other bids and offers relating to the specific item.

In one embodiment, a seller may have the ability to submit multiple offers. For instance, if a seller is looking to sell multiple items or tickets to a certain event, where for example the tickets may be for seats that are located in different sections or levels of a particular venue, the seller may be able to post several offers across different levels or sections of a particular venue for a particular event. Where some event locations, such as stadiums, theatres, etc., are broken down into different "areas," like sections or levels, a seller can post an offer based on the different areas available for each event. In one embodiment, after a seller posts an offer in an online marketplace, there may be a button or link, such as "Post Offer," wherein the seller can then submit another offer for a different section or level of the venue. In an alternative embodiment, after a seller posts an offer to the online marketplace, a dialog box may appear asking whether the seller would like to post another offer. In another embodiment, the seller actually owns the item or ticket before posting an offer for it in the system. In an alternative embodiment, the seller does not own the item or ticket, but posts an offer for it in the system anyway; in anticipation of the item or ticket selling, the seller then intends to purchase the same item or ticket almost simultaneously from some source to fulfill the contract.

FIG. 22 is an illustration of one embodiment of an interface for entering an offer for an item 2200. In one embodiment, at or about the time when a seller is entering an offer, the seller may be prompted with a dialog box or other interface to indicate whether this particular offer should be canceled by a certain date 2202. In further embodiments, the seller may be prompted with a dialog box or other interface to indicate whether this particular offer should be canceled upon another offer's execution for: (1) the same event 2204; (2) the same event in a particular level 2206; (3) the same event in a particular section 2208; (4) the same event in a particular row 2210; (5) the same event before a particular date 2212; (6) the same event if the price of the other offer's execution is higher than a particular price 2214; and/or (7) the same event if the price of the other offer's execution is lower than a particular price 2216. If the seller indicates he or she would like the offer to be canceled upon execution of another offer and one of the other offers is executed, then this offer may be canceled and removed from the real-time, or substantially real-time, auction database system automatically. If the seller indicates he or she would like the offer to remain active upon another offer's execution and one of the other offers is executed, then this offer may remain active in the real-time, or substantially real-time, auction database system, wherein the seller can sell additional items, such as event tickets to a specified event. In a further embodiment, the seller may be able to post offers in multiple different marketplaces, wherein the seller may be able to post multiple offers within each such marketplace.

FIG. 23 is an illustration of one embodiment of an interface for modifying an offer for an item 2300. In one embodiment, the system may allow the seller full functionality to cancel and/or modify offers at any time. In another embodiment, at or about the time when a seller is entering modifying an offer, the seller may be prompted with a dialog box or other interface to indicate whether this particular offer should be canceled by a certain date 2310. In another embodiment, the seller may modify the quantity 2302, multiple 2304, price 2306, and/or proxy price 2308 for an offer at any time. In further embodiments, the seller may modify the offer by indicating that a particular offer should be canceled upon another offer's execution for: (1) the same event 2312; (2) the same event in a particular level 2314; (3) the same event in a particular section 2316; (4) the same event in a particular row 2318; (5) the same event before a particular date 2320; (6) the same event if the price of the other offer's execution is higher than a particular price 2322; and/or (7) the same event if the price of the other offer's execution is lower than a particular price 2324.

FIG. 24 is an illustration of one embodiment of an interface showing all active offers for seller's items 2400. In another embodiment, the user can view both their active offers and active bids. In one embodiment, a seller may enter as many offers as a seller wishes; however, as soon as a sale is executed all other remaining offers may be automatically canceled from the system for that particular item and/or in that particular marketplace. For example, all offers may be canceled upon another offer's execution for: (1) the same event 2402; (2) the same event in a particular level 2404; (3) the same event in a particular section 2406; (4) the same event in a particular row 2408; (5) the same event before a particular date 2410; (6) the same event if the price of the other offer's execution is higher than a particular price 2412;

and/or (7) the same event if the price of the other offer's execution is lower than a particular price 2414. In another embodiment, the seller may cancel all offers within a certain row or row range 2416, placed before a certain date and time 2418, made before another particular offer 2420, and/or made after another particular offer 2422. In another embodiment, the system may allow a seller to keep open remaining offers even after a sale has been completed, wherein the seller can dictate which offers the seller would like to remain active and which offers should be canceled. In another embodiment of the invention, a seller may have multiple offers open but only want two of the offers linked such that if one offer executes the other linked offer cancels but the remaining offers stay open 2424. In another embodiment of the invention, a seller may have multiple offers open but only want two or more of the offers linked such that if one offer executes the other linked offers cancel but the remaining offers stay open. In another embodiment, the active offers can be sorted via a "view by" box 2426. The seller can sort the active offers by criterion such as order number, item type, event type, quantity, price, levels, sections, rows, whether negotiation is in process, and/or if an offer is linked to another offer for cancellation.

In one embodiment, the input of a seller's credit card information may fund a guaranty that a seller will complete a sale by transferring or sending the sold item to a buyer. In one embodiment, this may be of the form in which after a sale is completed, the seller's credit card is authorized an amount greater than or equal to the amount of the sale price of the item, and optionally any system fees associated with the transaction. This amount may be placed into an escrow account for a period of time, for example, forty-eight (48) hours until confirmation of the item is received. This time may be modified depending on the type of item being sold, the location of the parties, the mode of transferring the item, and the type of parties involved. If a seller does default on a sale, the buyer may be credited with an amount that is the sale price of the item or greater, which sum may be obtained from the escrow account, or directly from the seller's credit card. Additionally, for example, the defaulting seller may be banned and/or reported for fraud. In one embodiment of the invention, after a transaction is executed, the buyer is able to use a radio button to indicate if the seller shipped the item to the buyer or defaulted on the sale. In another embodiment, after a transaction is executed, if the buyer does not receive his or her item, the buyer can contact the website and the website will determine if the seller has defaulted on the sale. There are many other ways in which the auction system may fund a guaranty for the possibility of a defaulting seller.

When a seller is notified of a completed sale, in one embodiment, the seller may also be notified of how the buyer would like to receive the item. For example, the seller may be able to print a label to ship the item by mail or otherwise, such as FedEx or UPS, or in the event of e-tickets, for example, email the item directly to the buyer. There are numerous ways in which the seller may be notified on how to transfer the item from the seller to the buyer.

Figure 34:
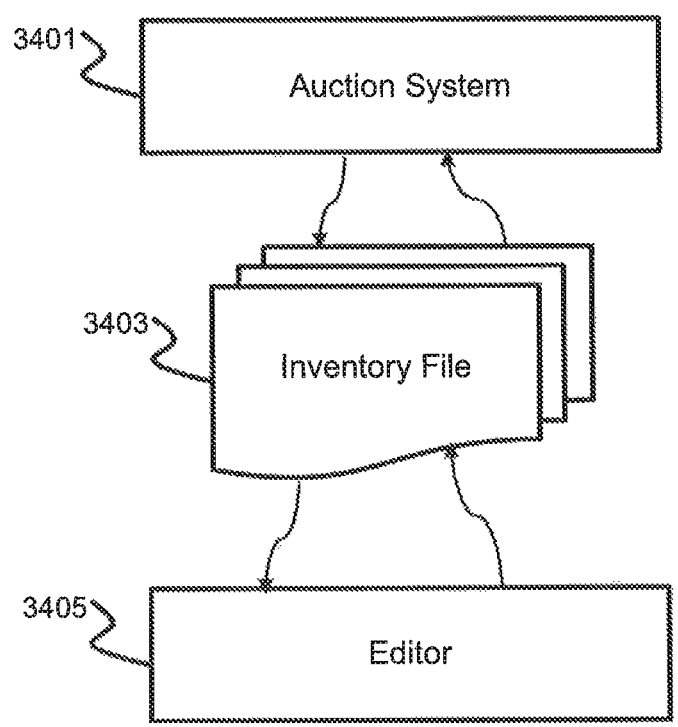
FIG. 34 is a system diagram depicting support for editable inventory files on a remote system.

In one embodiment of the system, the seller may provide inventory data to the auction via a programmatic interface. As illustrated in FIG. 34, the auction system 3401 can accept an inventory file 3402 from the seller. The inventory file can contain data including, but not limited to, the items available for sale by the seller, and posted and proxy offers for each inventory item or group of inventory items. The inventory file can be a text file, database file, XML file, spreadsheet file, or any other known file format. The auction system may be able to update the inventory file with the latest status of the inventory items listed. The seller may update the inventory file 3403 via an editor appropriate for the file format, for example, a text editor for a text file. The auction system may periodically access the inventory file to gather updated data.

Buyer

Figure 15:
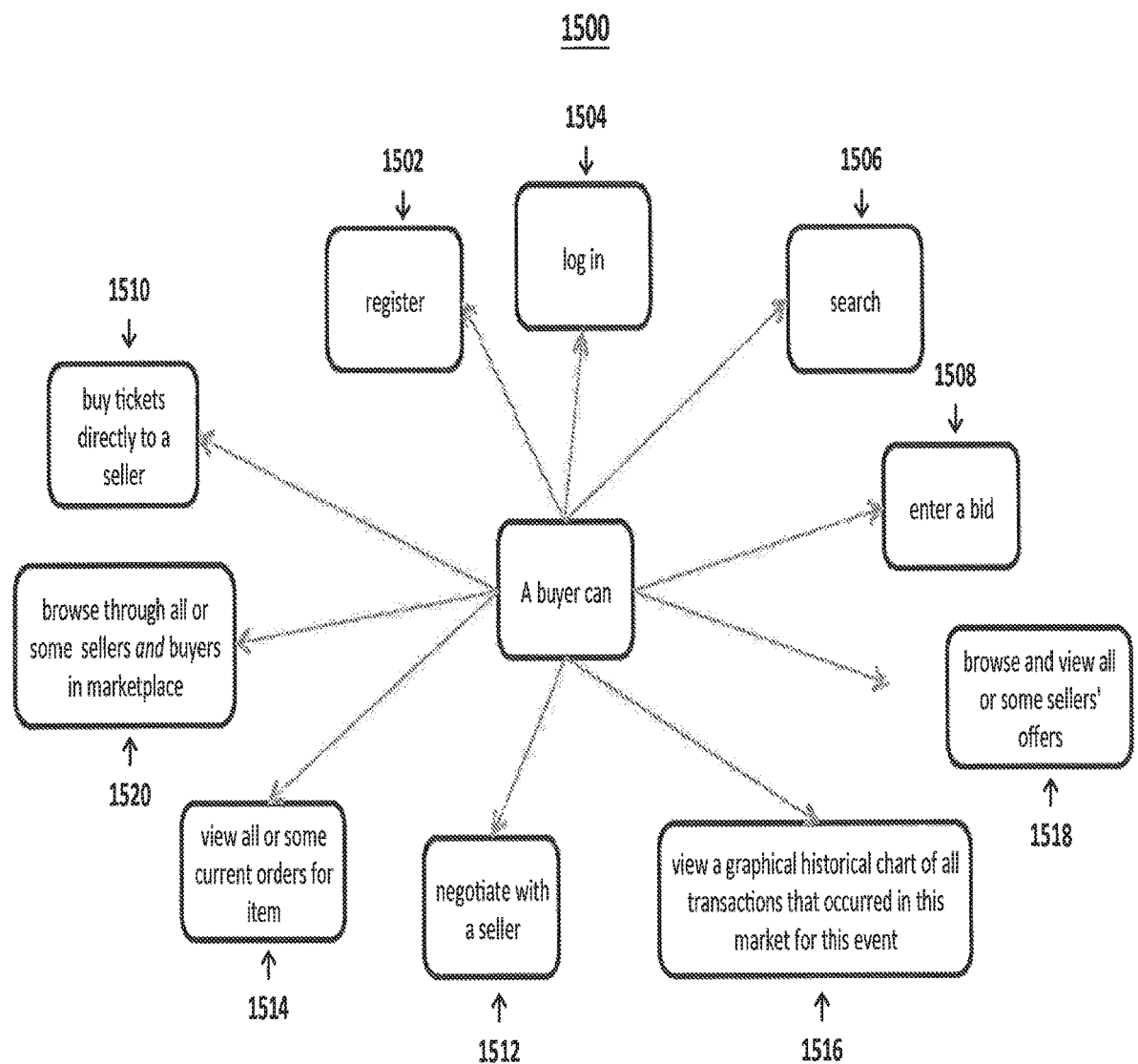
FIG. 15 is a diagram of one embodiment of a buyer's options, where the user becomes a buyer for the purposes of purchasing an item through the online marketplace auction.

FIG. 15 is a diagram of one embodiment of a buyer's options, where the user becomes a buyer for the purposes of purchasing an item—a good or service—through the online marketplace auction 1500. If the buyer is a first time user, the buyer can register 1502 with the system and create an account and online profile. If the buyer is a return user, the buyer can log in 1504 to their account. If a buyer is not a returning user, the buyer may be asked to register by creating a username and/or password. In one embodiment, the buyer can search 1506 the various databases or online marketplaces for the appropriate auction in which to buy their good or service. After a buyer has registered and/or logged in and entered a marketplace, a buyer can enter a bid 1508 on an item they would like to buy. If a buyer has posted a bid and no longer wants to wait for an automatic execution of a sale, the buyer can purchase the item directly from the seller 1510, and/or negotiate directly with the seller 1512 regarding the sale of that item. The buyer can also view all or some of the current orders for this item 1514, as well as view a graphical historical chart 1516 of all or some of the transactions that have occurred in this market. An order for an item can be either a bid or an offer. A buyer will only be able to place one posted bid on any individual item. A buyer can also browse and view all or some of the sellers' offers 1518, as well as browse all or some of the buyers and sellers in the marketplace 1520.

FIG. 16 is an illustration of one embodiment of the continuous dual auction database system's buyer montage 1600. In one embodiment, the buyer can be directed to a real-time, or substantially real-time, auction database webpage showing the current bids database 1602, the most recent transactions database 1604, the current best bid and offer database 1606, a current offers database 1608, a buyer's toolbox 1610, and/or a graphical chart 1612. In another embodiment, the webpage may also include the date and/or time the auction will end 1614. In a further embodiment, the webpage may include links to additional information, such as news 1616, charts 1618, weather 1620, other marketplace auctions that are similar to the specific item being sold 1622, and/or other marketplace auctions that are similar to the general item being sold 1624. In one embodiment of the invention, an auction similar to the specific item can be an item within the same auction; for example, in the case of a concert, different sections or seats within the same event. In another embodiment, an auction similar to the specific item can be other items related to the same auction; for example, in the case of a concert, different concert tickets for the same artist. In one embodiment of the invention, an auction similar to the general item can be an item not within the same auction; for example, in the case of a concert, different concert tickets for different artists. Additional links, buttons, information, or other suitable alternatives may be added or deleted depending on the type of item being sold, for example, whether it is a good or service. In one embodiment, where the item is a service, a link may be included that would describe in detail the service and what is included or not included, the possibility of modifying the service to include more or less of the services, etc.

In one embodiment, the buyer's toolbox 1610, may allow the buyer various options in which to modify the buyer's bid. One option may allow a buyer to modify the posted bid by a certain dollar amount. In one embodiment, a posted bid, as used herein, is meant to include the lowest amount a buyer desires to buy an item for, which amount is visible to others in the marketplace. In another embodiment, a posted bid, as used herein, is meant to include the highest amount a buyer desires to buy an item for, which amount is visible to others in the marketplace. A buyer may have the option to modify the posted bid at any time by a certain dollar amount by clicking on a button, for example a "Bid+$20" button 1626, wherein the buyer's posted bid amount may be automatically modified by the amount specified on the button. For example, the button "Bid+$20" may increase the buyer's posted bid by twenty dollars ($20). In one embodiment of the system, bids can be modified by whole dollar amounts eliminating or reducing worthless bid modifications. In one embodiment, the bid can be modified within a certain dollar amount increments, which incremental amounts may be different based on the item and/or price of the item being auctioned. Another advantage of the automatic amount modification may be to prevent untrue bids. In one definition of an untrue bid, the buyer enters a bid into the system and ends up not paying the seller after a transaction either because the buyer (1) never had an intention to purchase the item when the bid was placed or (2) developed the intention not to purchase the item after the bid was placed. In another definition of an untrue bid, the seller has an item to sell and wants to artificially inflate the perceived demand for the item in the current bids database 1602/1702. The seller then places at least one bid for the item, never intending to actually purchase the item but rather intending to fool users into thinking that the market bid rate is higher for the item than it actually is. In another embodiment, a bid can be modified in increments of a dollar. In one embodiment, the amount of the increments may be dependent on the value of the item in the marketplace. In one embodiment, a bid can be modified by using the keyboard or other input device in manipulating the amount of the bid.

In one embodiment, another toolbox 1610 option may be to buy an item at the current market price listed in the real-time, or substantially real-time, auction database 1602. A buyer wishing to purchase before their posted bid is hit, or otherwise desires to affect a sale quicker may buy at the then-currently lowest posted offer in the marketplace, creating a market sale. A hit, as the term is used herein, is meant to include when a seller enters the marketplace by posting an offer or modifying a previous offer so that the seller's offer equals the buyer's posted bid. In one embodiment, to execute a market sale, the buyer may click on a button, for example a "Buy Mkt" button 1628 in the buyer's toolbox 1610. In one embodiment, the quantity field 1630 may be expanded and/or may be automatically populated with the quantity of tickets the seller is willing to sell at that price. For example where the item of interest is an event ticket, a buyer may not have to purchase all tickets a seller may have available for purchase; however, in some embodiments, they may be required to purchase in a multiple the seller is asking for. The buyer may complete the transaction by clicking on a button, for example, on the "Submit" or "Continue" button 1632. After the buyer clicks on the button 1632, for example, another dialog box, webpage, or other interface may open to verify that the buyer wishes to proceed with this transaction. This may protect against the buyer from inadvertently affecting a market purchase where the buyer accidently clicks on the button 1632. This may also provide the buyer with a chance to review the information including the item(s) being bought, the price, and the seller before executing the sale. In one embodiment, the item(s) purchased may then be removed from the real-time, or substantially real-time, auction database 1602. The buyer's bid and the seller's offer relating to this sale may be removed from the real-time, or substantially real-time, auction database 1602. In another embodiment, the latest transaction database 1604 may then be updated with the most recent sale. In another embodiment, the chart 1612 will update as well, wherein the chart is a graphical representation of the transaction database.

In one embodiment, another option of the toolbox 1610 may be for the buyer to be able to modify their bid to become the best bid in the marketplace with a single click, as the case may be. In one embodiment, a buyer wishing to modify their bid wherein their bid becomes the new best bid in the marketplace, the buyer may be able to click on a button, for example a "Best Bid" button 1634, which would automatically modify the buyer's bid making it the best bid in the marketplace. In one embodiment, the buyer's bid will be modified by the incremental dollar amount already specified in relation to the specific marketplace. In another embodiment, the buyer may be able to indicate by what incremental dollar amount the buyer would like their new bid to be the best bid by. In another embodiment, the buyer may be able to enter into the system the exact price the buyer wants to modify his or her bid to.

In one embodiment, another option available to the buyer in the buyer's toolbox 1610 may be for the buyer to modify the amount of the item, such as the amount of tickets or the multiple of tickets the buyer would like to buy. In one embodiment, the buyer may click on a button, for example a "Quantity" or "Inc. Qty x #" button 1630, wherein once the buyer clicks on the button a dialog box may open, the buyer may be directed to a new webpage, or the buyer may be presented with another interface, wherein the buyer can modify the number of items, for example, number of tickets the buyer would like to buy. In another embodiment, the buyer may also be able to modify the multiple of items, such as tickets the buyer is willing to purchase.

FIG. 17 is an illustration of another embodiment of the continuous dual auction database system's buyer montage 1700. In one embodiment, the buyer can be directed to a real-time, or substantially real-time, auction database webpage showing the current bids database 1702, the most recent transactions database 1704, the current best bid and offer database 1706, a current offers database 1708, a buyer's toolbox 1710, and/or a graphical chart 1712. In another embodiment, the webpage may also include the date and/or time the auction will end 1714. In a further embodiment, the webpage may include links to additional information, such as news 1716, charts 1718, weather 1720, other marketplace auctions that are similar to the specific item being sold 1722, and/or other marketplace auctions that are similar to the general item being sold 1724. In one embodiment of the invention, an auction similar to the specific item can be an item within the same auction; for example, in the case of a concert, different sections or seats within the same event. In another embodiment, an auction similar to the specific item can be other items related to the same auction; for example, in the case of a concert, different concert tickets for the same artist. In one embodiment of the invention, an auction similar to the general item can be an item not within the same auction; for example, in the case of a concert, different concert tickets for different artists. Additional links, buttons, information, or other suitable alternatives may be added or deleted depending on the type of item being sold, for example, whether it is a good or service. In one embodiment, where the item is a service, a link may be included that would describe in detail the service and what is included or not included, the possibility of modifying the service to include more or less of the services, etc.

In a further embodiment, the current bids database 1702 may provide the buyer with additional functionality in modifying their bid. In one embodiment, the database 1702 may have a column entitled "Multiple" 1726, for example, wherein the number of the item being sought is listed in the column. For instance, a buyer may be bidding on an item in which he desires a quantity of 10 and wishes to buy them in pairs or other increments thus alerting sellers as to what as well as how many of an item is being bid on. In another embodiment, there may also be a column entitled "Quantity" (not shown on the figure), wherein the buyer can enter the number of items he has and/or wishes to buy. In another embodiment, the column would also include a way for the buyer to modify the number of items being sought by either clicking on a down arrow type of a button, for example, or other way in allowing the buyer to easily modify the number of the item.

In one embodiment, the database 1702 may include a column entitled "Buy Now" 1728, for example. This column may be a button or link wherein if the buyer presses or clicks on the "Buy Now" button or link associated with the offer the buyer is interested in (these may be in the same row) and a sale may execute. In one embodiment, after the buyer clicks, for example on the "Buy Now" button, another webpage, dialog box, or other interface may open in which the buyer has the chance to review the sale before completing the transaction. This may also act as a safety to verify the buyer wanted to make this sale and did not accidently click on the button.

In one embodiment of the invention, when the buyer clicks "Buy Now" 1728, the system will allow the buyer to select an offer with the multiple 1726 the buyer wishes to purchase. In another embodiment, the seller may be selling in a larger multiple 1726 than the buyer wishes to purchase; in this case, the buyer has to choose another offer that has the multiple 1726 the buyer desires. In another embodiment, if the seller is selling in a larger multiple 1726 than the buyer wishes to purchase, after the buyer clicks "Buy Now" 1728, the system will allow the buyer to select negotiate 1730 and inquire if the seller is willing to sell the item in the buyer's desired multiple 1726.

In another embodiment, the offers can be sorted by clicking on a "sort sellers by" 1734 down arrow type of a button and selecting criterion such as offer price, quantity, multiple, row ranges, aisle seats only, item sold by date, or item color.

In one embodiment, the database 1702 may have a column entitled "Negotiate" 1730, for example. This column may be a button or link where the buyer presses or clicks on the "Negotiate" button or link associated with the offer the buyer is interested in (these may be in the same row) and a negotiation notification and/or alert may be sent to the intended seller. In one embodiment, after the buyer clicks, for example, on the "Negotiate" button, another webpage, dialog box, or other interface may open in which the buyer may begin negotiations with a seller for the sale of an item. How a negotiation works or may be done is explained in more detail below with respect to FIG. 21. FIG. 18 is an illustration of one embodiment of a buyer's item information page 1800. In one embodiment, where a buyer may initiate the posting of a bid, a dialog box may open, the buyer may be directed to a new webpage, or the buyer may be presented with another interface where the buyer may be prompted to enter certain information related to the item being sought. For example, if the item was an event ticket, such information as the event name 1802, date 1804, time 1806, venue 1808, section 1810, and/or row 1812 may be entered into the system. A buyer may enter all or some of this information in any number of ways. For example, a buyer may directly type the information into the relevant space, there may be a drop down box in which the buyer can select from, or any other way in which to enter data into the system or any combination thereof.

In one embodiment, a link may pull up a map of the venue in which the buyer may be able to click within a certain section of the venue map and these entries will be automatically populated with this information. Depending on the item being sought for purchase, a buyer may be required to enter some or all of this information, i.e., some of the information may be optional. What information a buyer may enter may be dependent on what is being sought for purchase by the buyer, wherein additional or different information may be required or optional for the buyer to enter.

The buyer may also input the proxy bid 1814, the posted bid 1816, the quantity of tickets being sought 1818, and in what multiple 1820 the tickets may be bought if the seller has more than one. The proxy bid 1814, as used herein, is meant to include the highest amount a buyer is willing to purchase an item for, which amount is not visible to others in the marketplace. How a proxy bid 1814 works is explained in more detail in FIG. 20 below. A buyer may enter this information in any number of ways. For example, a buyer may directly type the information into the relevant space, there may be a drop down box in which the buyer can select from, or any other way in which to enter data into the system or any combination thereof. Instead of a separate webpage, this may be a pop-up box or other interface. The buyer may click a button, for example, a "Continue" button 1822, wherein the buyer may choose the means in which the buyer would like to back the bid. For example, the buyer may choose to back the bid by using the buyer's system account, which may have been funded by the buyer's own funds, a saved credit card, or enter a new or different credit card to proceed with the posting of the bid in the marketplace auction.

FIG. 19 is an illustration of one embodiment of a dialog box in which a buyer may select a credit card to use for a transaction 1900. The buyer may select to use the credit card information already stored in the buyer's account profile, or, if there is more than one credit card stored, the buyer may choose the credit card they would like to use for the transaction, or the buyer may enter credit card information into the system for the purpose of this transaction. If a buyer has multiple credit cards on file, at the top of the dialog box, for instance in one embodiment, the buyer may be able to choose which credit card they would like to use, for example, from a drop down box 1902 or other means. The buyer may be required to enter the security code 1904 associated with the chosen credit card, and/or the buyer's email address 1906, for verification purposes. If the buyer does not have or does not want to use a saved or new credit card, the buyer may choose to use the buyer's system account instead. If the buyer has more than one account, the buyer may be able to select which account the buyer would like to use to back the bid being posted.

If the buyer would like to use a new and/or different credit card for the transaction, the buyer may input the type of credit card 1908, the credit card number 1910, the expiration of the credit card 1912, the security code for the credit card 1914, the first name shown on the credit card 1916, the middle initial or name shown if shown on the card 1918, the last name shown on the credit card 1920, the billing street address 1922, country 1924, city 1926, state 1928, zip code 1930, phone number 1932 and/or email address 1934. Some information that a buyer may input may be required and some information may be optional. After the buyer inputs this information, the buyer may click on a button to continue, such as a button labeled "Continue," 1936. The buyer may be asked by the system if the buyer would like to save this credit card information in the system. This may be accomplished in any number of ways, for example in one embodiment a pop-up, dialog box may appear after a buyer clicks the "Continue" button 1936. If the buyer wishes to save the credit card, they may be asked to name the card for later recognition. If not, in one embodiment or an alternative embodiment, the credit card information may remain in the system for only the duration of the auction in which the buyer has the bid listed, which bid includes this particular credit card information. If a buyer does not complete a sale by the time the auction ends, the credit card information may be deleted from the system. In another embodiment, the credit card information may remain in the system as part of the user history.

After the credit card information is entered into the system and confirmed, and/or the account is verified to contain sufficient funds, the auction database system may upload the item information being sought for purchase into the related event-specific real-time, or substantially real-time, auction system database, as noted above with respect to FIG. 16. The buyer may be brought into the online auction marketplace and may be able to see all other bids and offers relating to the specific item.

In one embodiment, a buyer may have the ability to submit multiple bids. For instance, if a buyer is looking to purchase tickets to a certain event and is open to different sections or levels of a particular venue, the buyer may be able to post several bids across different levels or sections of a particular venue for a particular event. Where some event locations, such as stadiums, theatres, etc., are broken down into different "areas," like sections or levels, a buyer can post a bid based on the different areas available for each event. In one embodiment, after a buyer posts a bid in an online marketplace, there may be a button or link such as "Post Bid," wherein the buyer can then submit another bid for a different section of the venue. In an alternative embodiment, after a buyer posts a bid to the online marketplace, a dialog box may appear asking whether the buyer would like to post another bid.

In one embodiment, a buyer may have the ability to submit a single bid for items across a custom bid group. For instance, if a buyer is looking to purchase tickets to a certain event and is open to different sections, levels, rows, or seats of a particular venue, the buyer may be able to post a single bid for all of the tickets that the buyer is interested in. In one embodiment, after a buyer selects the sections, levels, rows, or seats that the buyer is interested in for a bid group, there may be a button or a link such as "Post Bid," wherein the buyer can submit a bid for the bid group.

FIG. 25 is an illustration of one embodiment of an interface for entering a bid for an item 2500. In one embodiment, at or about the time when a buyer is entering a bid, the buyer may be prompted with a dialog box or other interface to indicate whether this particular bid should be canceled by a certain date 2502. In further embodiments, the buyer may be prompted with a dialog box or other interface to indicate whether this particular bid should be canceled upon another bid's execution for: (1) the same event 2504; (2) the same event in a particular level 2506; (3) the same event in a particular section 2508; (4) the same event in a particular row 2510; (5) the same event before a particular date 2512; (6) the same event if the price of the other bid's execution is higher than a particular price 2514; and/or (7) the same event if the price of the other bid's execution is lower than a particular price 2516. If the buyer indicates he or she would like the bid to be canceled upon execution of another bid and one of the other bids is executed, then this bid may be canceled and removed from the real-time, or substantially real-time, auction database system automatically. If the buyer indicates he or she would like the bid to remain active upon another bid's execution and one of the other bids is executed, then this bid may remain active in the real-time, or substantially real-time, auction database system, wherein the buyer can buy additional items, such as event tickets to a specified event. In a further embodiment, the buyer may be able to post bids in multiple different marketplaces, wherein the buyer may be able to post multiple bids within each such marketplace.

FIG. 26 is an illustration of one embodiment of an interface for modifying a bid for an item 2600. In one embodiment, the system may allow the buyer full functionality to cancel and/or modify bids at any time. In another embodiment, at or about the time when a buyer is entering modifying a bid, the buyer may be prompted with a dialog box or other interface to indicate whether this particular bid should be canceled by a certain date 2610. In another embodiment, the buyer may modify the quantity 2602, multiple 2604, price 2606, and/or proxy price 2608 for a bid at any time. In further embodiments, the buyer may modify the bid by indicating that a particular bid should be canceled upon another bid's execution for: (1) the same event 2612; (2) the same event in a particular level 2614; (3) the same event in a particular section 2616; (4) the same event in a particular row 2618; (5) the same event before a particular date 2620; (6) the same event if the price of the other bid's execution is higher than a particular price 2622; and/or (7) the same event if the price of the other bid's execution is lower than a particular price 2624.

FIG. 27 is an illustration of one embodiment of an interface showing all active bids for the buyer 2700. In another embodiment, the user can view both their active offers and active bids. In one embodiment, a buyer may enter as many bids as a buyer wishes; however, as soon as a sale is executed all other remaining bids may be automatically canceled from the system for that particular item and/or in that particular marketplace. For example, all bids may be canceled upon another bid's execution for: (1) the same event 2702; (2) the same event in a particular level 2704; (3) the same event in a particular section 2706; (4) the same event in a particular row 2708; (5) the same event before a particular date 2710; (6) the same event if the price of the other bid's execution is higher than a particular price 2712; and/or (7) the same event if the price of the other bid's execution is lower than a particular price 2714. In another embodiment, the buyer may cancel all bids within a certain row or row range 2716, placed before a certain date and time 2718, made before another particular bid 2720, made after another particular bid 2722 and/or that are aisle seat bids 2724. In another embodiment, the system may allow a buyer to keep open remaining bids even after a sale has been completed, wherein the buyer can dictate which bids the buyer would like to remain active and which bids should be canceled. In another embodiment of the invention, a buyer may have multiple bids open but only want two of the bids linked such that if one bid executes the other linked bid cancels but the remaining bids stay open 2726. In another embodiment of the invention, a buyer may have multiple bids open but only want two or more of the bids linked such that if one bid executes the other linked bids cancel but the remaining bids stay open. In another embodiment, the active bids can be sorted via a "view by" box 2728. The buyer can sort the active bids by criterion such as order number, item type, event type, quantity, price, levels, sections, rows, whether negotiation is in process, and/or if a bid is linked to another bid for cancellation.

In one embodiment, the input of a buyer's credit card information may fund a guaranty that a buyer will complete a sale by having the funds available to be transferred to the seller. In one embodiment, this may be of the form in which when a bid is entered or a negotiation started, the buyer's credit card is authorized an amount equal to or greater than the amount of the sale price of the item, and optionally any system fees associated with the transaction. This amount may be placed into an escrow account for a period of time, for example, forty-eight (48) hours until confirmation of the item is received. This time may be modified depending on the type of item being sold, the location of the parties, the mode of transferring the item, and the type of parties involved. If a buyer does default on a sale, the seller may be credited with an amount greater than the sale price of the item, which sum may be obtained from the escrow account or directly from the buyer's credit card. Additionally, for example, the defaulting buyer may be banned and/or reported for fraud. In one embodiment of the invention, after a transaction is executed, the seller is able to use a radio button to indicate if the buyer paid for the item or defaulted on the sale. In another embodiment, after a transaction is executed, if the seller does not receive payment for his or her item, the seller can contact the website and the website will determine if the buyer has defaulted on the sale. There are many other ways in which the auction system may fund a guaranty for the possibility of a defaulting buyer.

When a buyer is notified of a completed sale, in one embodiment, the buyer may also be asked how the buyer would like to receive the item. For example, the buyer may be able to select to have the item shipped by mail or otherwise, such as FedEx or UPS, or in the event of e-tickets, for example, email the item directly to the buyer. There are numerous ways in which the buyer may select the item from the seller to be transferred to the buyer.

Figure 13:
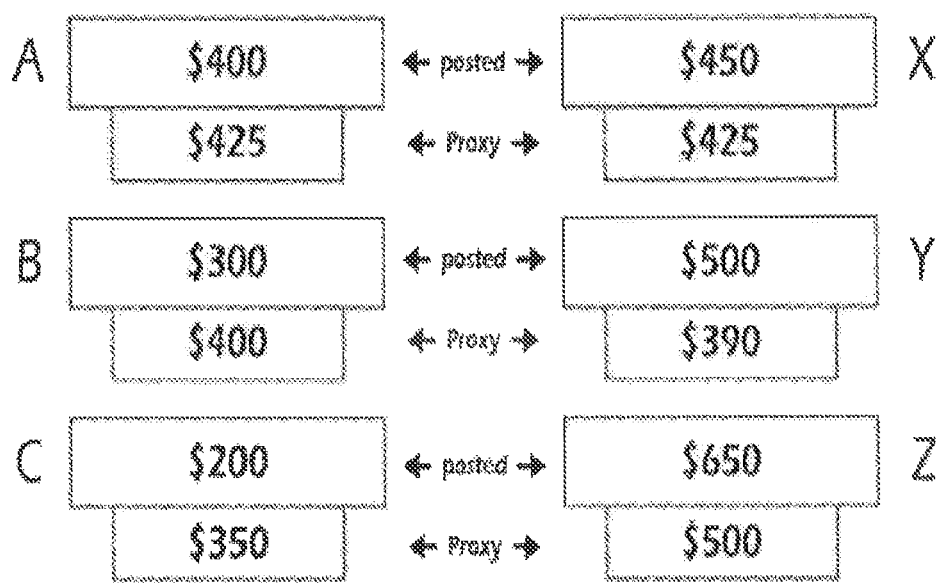
FIG. 13 is an illustration for assisting in the explanation of how a proxy offer might work, according to one embodiment of the present disclosure.

Proxy Offers and Bids:

FIG. 13 is an illustration for assisting in the explanation of how a proxy offer might work, according to one embodiment of the present disclosure 1300. One advantage of a seller's proxy offer is that it allows the seller to set up a range value wherein the seller is willing to sell a given item and execute a sale without having to continuously monitor the marketplace for new buyers. Another advantage is that the proxy offer may eliminate the need to repeatedly modify the offer. The proxy offer diagram 1300 may reflect a transaction execution wherein a proxy offer is equal to or less than a posted bid. A proxy offer, as used herein, is meant to include the lowest amount a seller wishes to sell an item for, which amount is not visible to others in the marketplace. For example, seller Y in the diagram 1300 may complete a transaction with buyer A because seller Y's proxy offer is less than buyer A's posted bid. In one embodiment where a transaction may match a seller and a buyer together because a proxy offer and a posted bid transact, the sale may be executed automatically at the posted bid amount. In another embodiment, a seller may be notified of such a lift and have the ability to execute the sale or decline to execute. In another embodiment, a sale will only execute due to a posted bid. In one embodiment, a proxy offer and a proxy bid cannot execute to complete a sale as neither one are posted visibly to the entire marketplace. In another embodiment, there must be at least one posted order for a transaction—either a posted bid and proxy offer or a proxy bid and a posted offer.

In another embodiment, an email notice or alert could be used to notify a seller that a buyer's posted bid has matched up with a seller's proxy offer. In another embodiment, the notice or alert may be of the form of a text message indicating a lift or sale. If a sale is executed or a new buyer enters a bid that matches a seller's proxy offer, both the bid and offer may be removed from an auction's real-time, or substantially real-time, auction database and the corresponding auction latest transaction database may be updated with the sale. There may be other variants on how a seller's proxy offer may execute a transaction, such as negotiating, which is explained in more detail below in FIG. 14.

Figure 20:
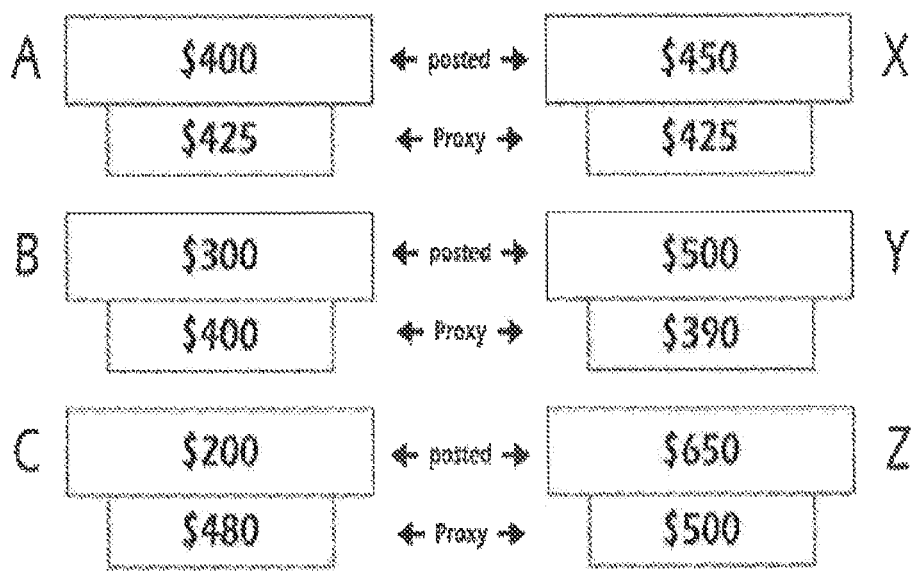
FIG. 20 is an illustration for assisting in the explanation of how a proxy bid might work, according to one embodiment of the present disclosure.

FIG. 20 is an illustration for assisting in the explanation of how a proxy bid might work, according to one embodiment of the present disclosure 2000. One advantage of a buyer's proxy bid is that it allows the buyer to set up a range value wherein the buyer is willing to buy a given item and execute a sale without having to continuously monitor the marketplace for new sellers. Another advantage is that the proxy bid may eliminate the need to repeatedly modify the bid. The proxy bid diagram 2000 may reflect a transaction execution wherein a proxy bid is equal to or more than a posted offer. A proxy bid, as used herein, is meant to include the highest amount the buyer is willing to pay for a certain item, which amount is not visible to others in the marketplace. For example, buyer C in the diagram 2000 may complete a transaction with seller X because buyer C's proxy bid is more than seller X's posted offer. In one embodiment where a transaction may match a buyer and a seller together because of a proxy bid and posted offer, the buyer may or may not decide to execute this transaction. In another embodiment, these types of transaction automatically execute a sale between a buyer's proxy bid and a seller's posted offer. In another embodiment, a sale will only execute due to a posted offer. In one embodiment, a proxy bid and a proxy offer cannot execute to complete a sale as neither one is posted visibly to the entire marketplace. In another embodiment, there must be at least one posted order for a transaction either a posted bid and proxy offer or a proxy bid and a posted offer.

In another embodiment, an email notice or alert has been setup to notify buyer that a seller's posted offer has matched up with a buyer's proxy bid. In another embodiment, the notice or alert may be of the form of a text message indicating a hit or sale. If a sale is executed or a new seller enters an offer that matches a buyer's proxy bid, both bid and offer may be removed from an auction's real-time, or substantially real-time, auction database and the corresponding auction latest transaction database may be updated with the sale. A sale may also be executed where a seller's posted offer and a buyer's posted bid are the same. There may be other variants on how a buyer's proxy bid may execute a transaction, such as negotiating, which is explained in more detail below in FIG. 21.

Figure 14:
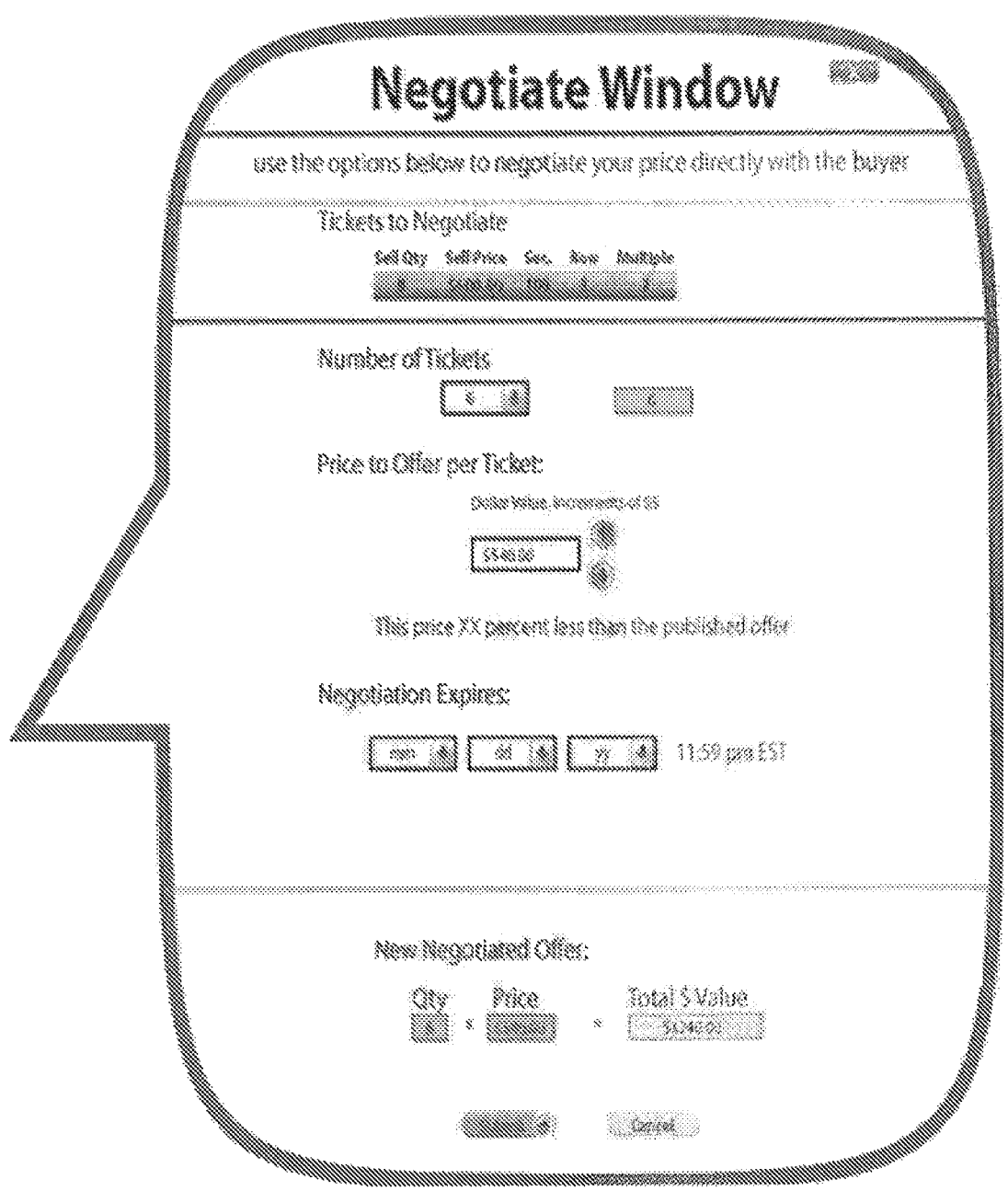
FIG. 14 is an illustration of one embodiment of a seller's negotiation dialog box.

Negotiation:

FIG. 14 is an illustration of one embodiment of a seller's negotiation dialog box 1400. For example, if a seller does not want to execute a market sale (sell directly to a buyer) because the seller does not like the then-current market price for the item (or highest posted bid), the seller does not want to wait for their posted offer to be lifted, or for any other reason, the seller may enter into negotiations with a buyer.

One purpose of negotiations is to enable the near immediate sale of an item by allowing a seller to create a mini-marketplace wherein the seller brings in a buyer hoping that the seller and the buyer can reach agreement on the price of the item. The seller may do so by clicking on a negotiate button, for example a "Begin Negotiations" button that may be in a seller's toolbox, or it may be on the auction system database webpage, or some other configuration, like a link or option from a drop down menu box. If a seller, for instance, clicks on the negotiation button, in one embodiment a negotiation dialog box 1400 may appear. The dialog box 1400 may contain such information as the item being negotiated about, the number of the items, the posted offer, when the negotiation is set to expire, and the new "Price to Offer per Ticket" box. The dialog box 1400 may contain any or all of the foregoing things, some of them, any combination, and/or the addition of other information. In another embodiment, instead of a dialog box, the seller may be directed to another webpage wherein the seller may invite, or otherwise select, the buyer into that new webpage to negotiate the price of the particular item. In another embodiment, an email may be opened up or created wherein the seller may email the selected buyer about the particular item. In one embodiment, the email may be a notification to log in and check pending negotiations. In another embodiment, the email message may automatically populate with certain information and be sent by the system on behalf of the seller to the selected buyer to begin negotiating the amount on a particular item. The selected buyer may then have the ability to either accept the offer, refuse the offer, or submit a counteroffer to the seller, which may include any new information, such as price, quantity, when the counteroffer expires, etc., or any combination thereof. The seller may then accept, refuse, or counter the buyer's counteroffer. In one embodiment, the seller may or may not limit the number of times the seller and buyer may counteroffer. In one embodiment, a seller may be alerted by email that a buyer would like to negotiate with the seller. The seller can then log into the system, go to active negotiations and view the new negotiation. In one embodiment, the seller may be able to respond to the new negotiation through the email alert.

Figure 21:
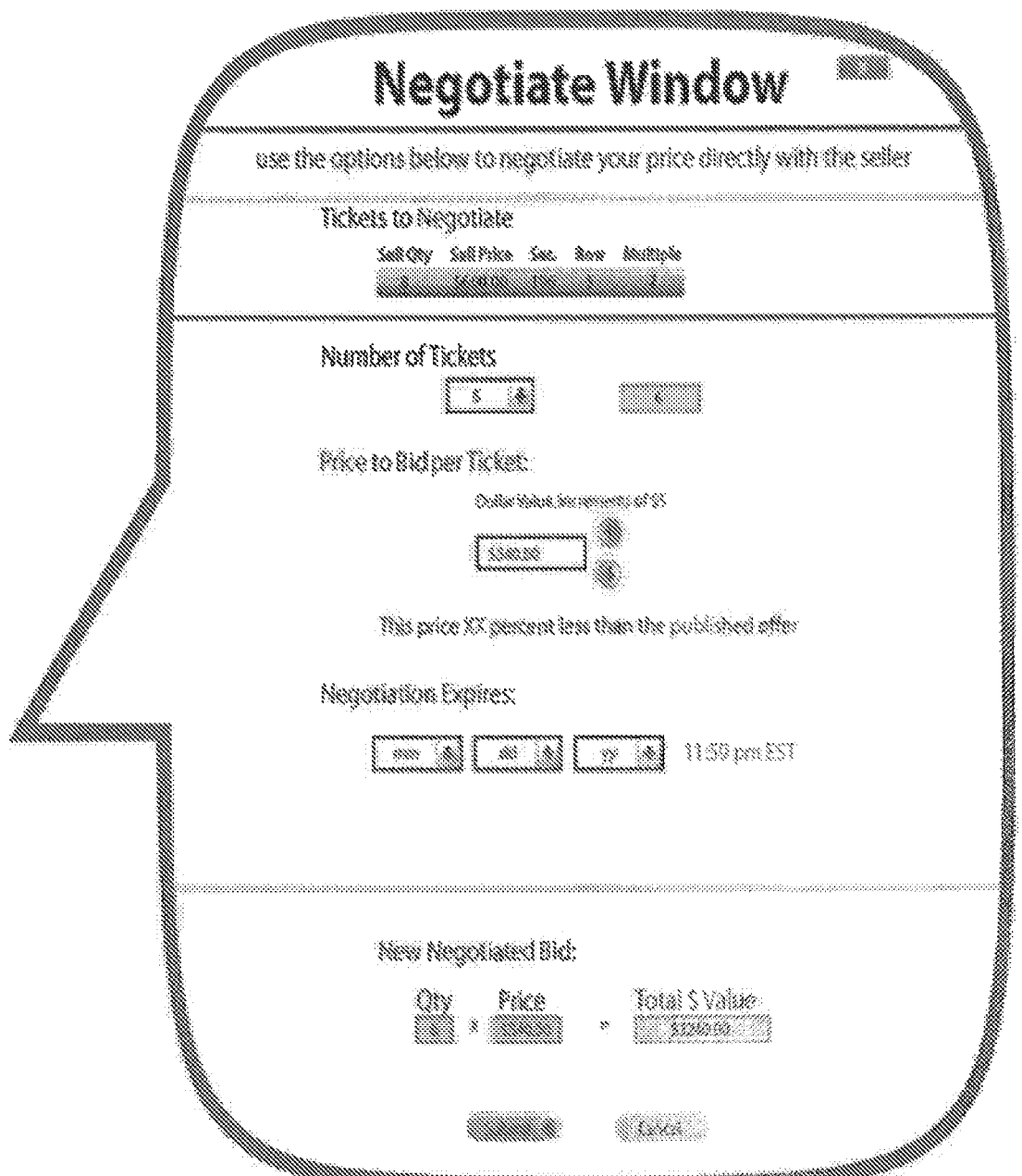
FIG. 21 is an illustration of one embodiment of a buyer's negotiation dialog box.

FIG. 21 is an illustration of one embodiment of a buyer's negotiation dialog box 2100. For example, if a buyer does not want to execute a market sale (buy directly from a seller) because the buyer does not like the then-current market price for the item (or lowest posted offer), the buyer does not want to wait for their posted bid to be hit, or for any other reason, the buyer may enter into negotiations with a seller. One purpose of negotiations is to enable the near immediate sale of an item by allowing a buyer to create a mini-marketplace wherein the buyer brings in a seller hoping that the buyer and the seller can reach agreement on the price of the item. The buyer may do so by clicking on a negotiate button, for example a "Begin Negotiations" button that may be in a buyer's toolbox, or it may be on the auction system database webpage, or some other configuration, like a link or option from a drop down menu box. If a buyer, for instance, clicks on the negotiation button, in one embodiment a negotiation dialog box 2100 may appear. The dialog box 2100 may contain such information as the item being negotiated about, the number of the items, the posted bid, when the negotiation is set to expire and the new "Price to Bid per Ticket" box. The dialog box 2100 may contain any of the foregoing things, some of them, any combination, and/or the addition of other information. In another embodiment, instead of a dialog box, the buyer may be directed to another webpage wherein the buyer may invite, or otherwise select, the seller into that new webpage to negotiate the price of the particular item. In another embodiment, an email may be opened up or created wherein the buyer may email the selected seller about the particular item. In one embodiment, the email may be a notification to log in and check pending negotiations. In another embodiment, the email message may automatically populate with certain information and be sent by the system on behalf of the buyer to the selected seller to begin negotiating the amount on a particular item. The selected seller may then have the ability to either accept the bid, refuse the bid, or submit a counteroffer to the buyer, which may include any new information, such as price, quantity, when the counteroffer expires, etc., or any combination thereof. The buyer may then accept, refuse, or counter the seller's counteroffer. In one embodiment, the buyer may or may not limit the number of times the seller and buyer may counteroffer. In one embodiment, a buyer may be alerted by email that a seller would like to negotiate with the buyer. The buyer can then log into the system, go to active negotiations and view the new negotiation. In one embodiment, the buyer may be able to respond to the new negotiation through the email alert.

Dynamic Bid Groups

Figure 33:
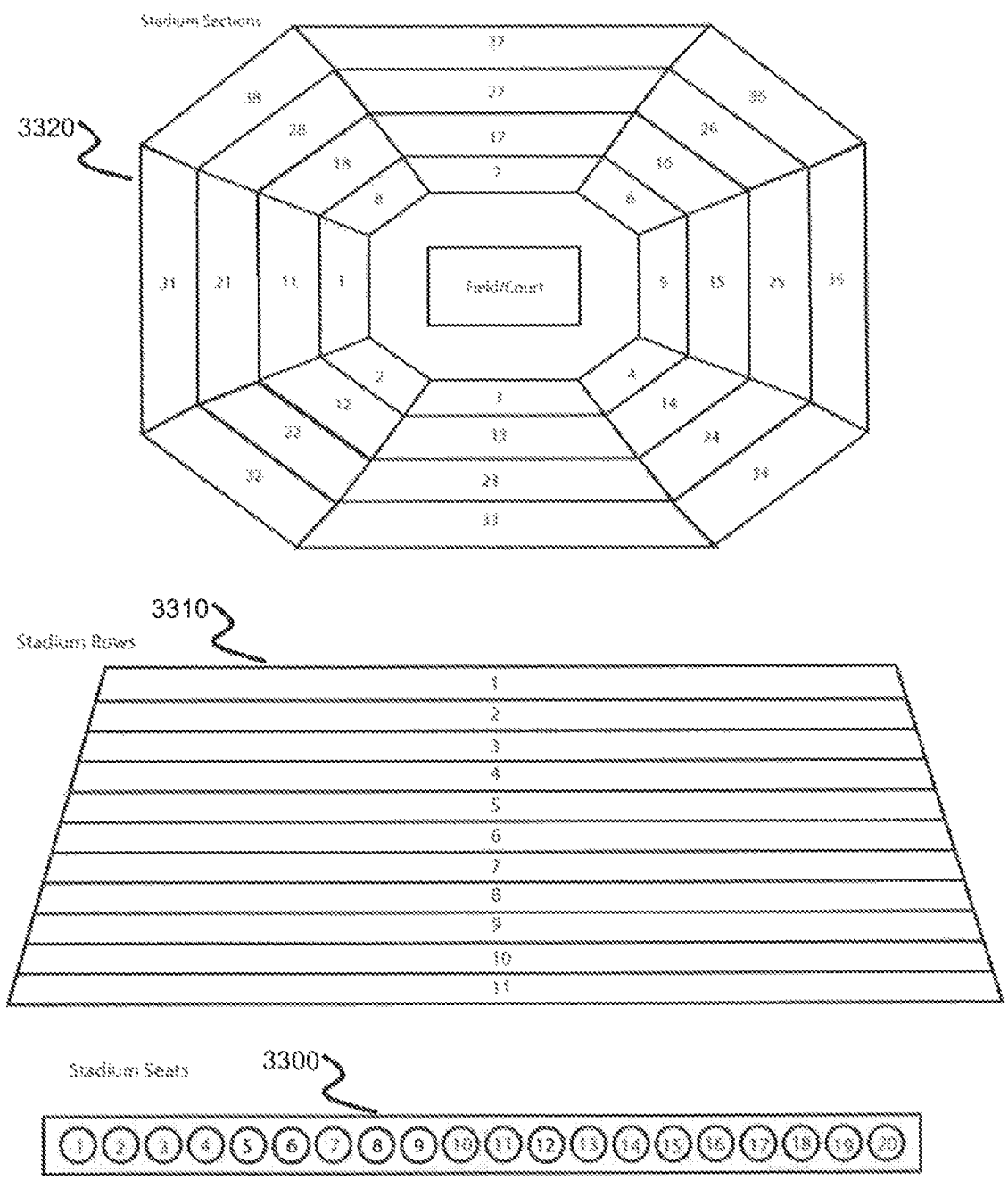
FIG. 33 is an illustration of one embodiment of an interface showing groups of rows categorized by individual rows and seats.

FIG. 33 is an illustration of one embodiment of an interface showing a venue categorized by individual seats 3300. In one embodiment, where the user selects a section as shown in FIG. 31, the groups of rows in the chosen section 3202 may appear. In another embodiment, where the user selects "upper level" as shown in FIG. 30, the groups of rows in the chosen level 3202 may appear. In one embodiment, the section or level may be categorized by multiple groups of rows 3204. Further, each group of rows can contain individual rows 3310, and each individual row can contain individual seats 3300. In one embodiment, where the user has selected a group of rows, individual rows may appear. Where the user has selected an individual row, the individual seats may appear.

In another embodiment, a buyer may choose to define a custom bid group of event tickets that the buyer is interested in. In such an embodiment, where the buyer selects an event as shown in FIG. 29, the venue map for the appropriate venue 3002 may appear. The buyer's bid group may have one or more parameters such as one or more venue levels, one or more venue sections, one or more venue rows, one or more individual seats, or one or more star levels. The buyer may choose to view all of the offers for tickets that satisfy the parameters of a particular bid group.

Remote System

FIGS. 35-44 illustrate an application configured to allow management of the seller's inventory from a computer system that is remote from the auction system. The remote system could be local to the seller's computer, smartphone, tablet, or other computing device. The remote system could also be another web server or other internet service remote from the auction system. The remote system can support management of the seller's inventory file and act as an editor as describe in FIG. 34. While the example embodiments shown in these figures may use elements such as buttons or text dialogs, it is appreciated that any appropriate user interface elements may be substituted.

Figure 35:
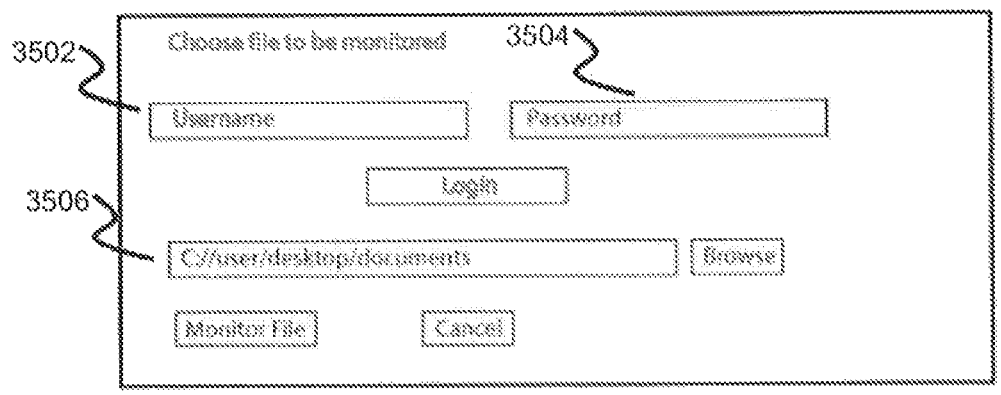
FIG. 35 is an illustration of an example a file upload dialog of a remote system.

FIG. 35 illustrates a login and inventory file selection dialog 3500 according to one embodiment. The user is prompted to enter login 3502 and password 3504 details as well as the location of an inventory file 3506. FIG. 36 is a representation of an inventory file 3600, listing both buy and sell actions by the user. For each action there is an order number 3602, an item name 3604, an action (buyer or seller)

3606, and an order price 3608, which are provided by the user. There are also a best bid 3610 and a best offer 3612 that are updated by the auction system.

Figure 37:
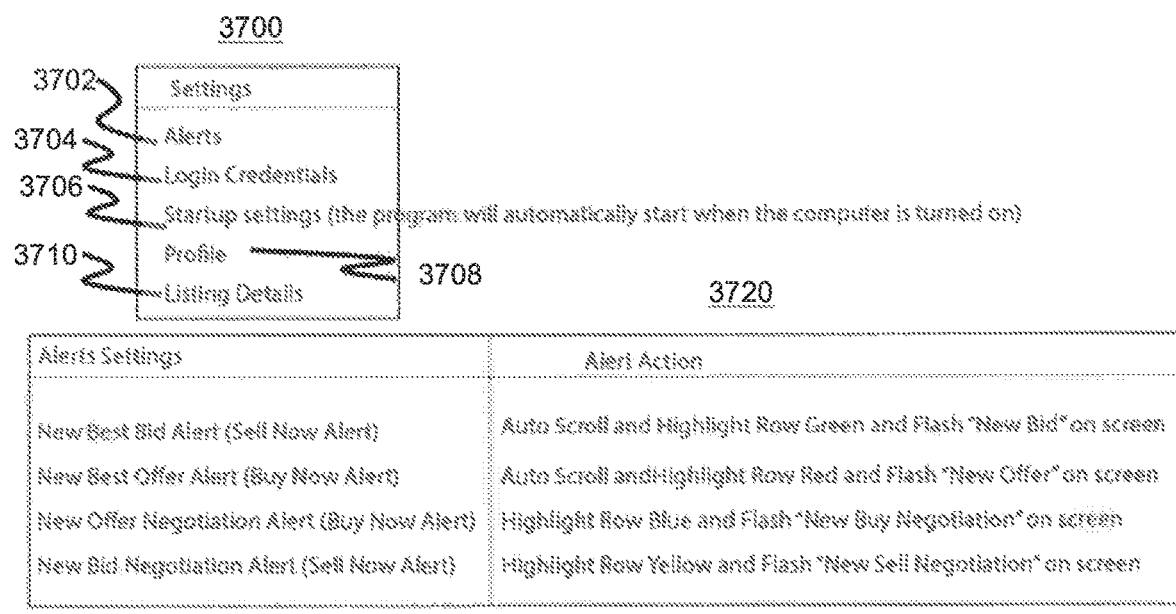
FIG. 37 is an illustration of sample configuration items of a remote system.

FIG. 37 illustrates some of the options that the remote system can allow the user to configure. In one embodiment, the system can present a user with a menu 3700 providing options to configure Alerts 3702, Login Credentials 3704, Startup settings 3706, Profile 3708, and Listing Details 3710. If the user chooses Alerts 3702 then a submenu 3720 can be displayed allowing users to choose which alerts the user wishes to receive as well as which action should be taken for each alert type.

FIG. 38 illustrates a Listing Details page 3800 displaying the essentially the same listing information in FIG. 36; however, the Best Bid price for Order #8 has been updated from $40 to $50. In this example, the user is a seller of Order #8 and wishes to sell tickets at $85. Another user who is a buyer has entered a bid of $40 for the tickets, and the auction system has updated the remote system, and this information is presented to the seller. Because the seller has chosen to enable "New Best Bid" alerts, the order listing is highlighted 3810, and alert text "New Bid" 3812 appears on the screen.

Figure 39:
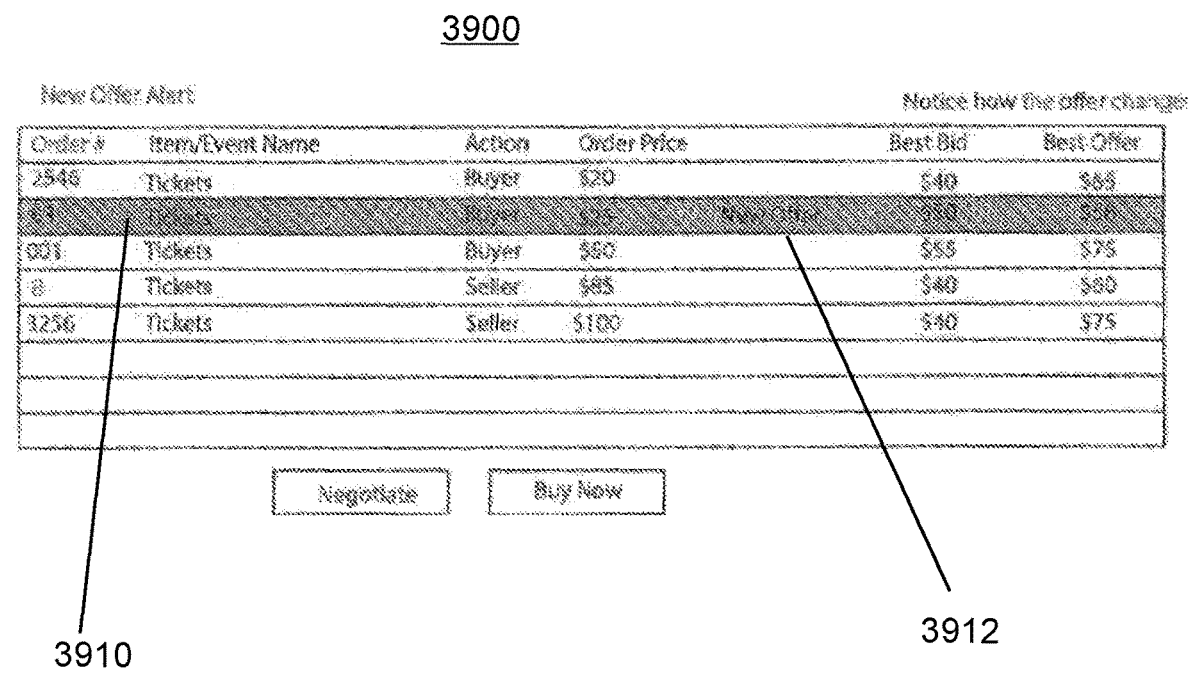

FIG. 39 illustrates Listing Details page 3900 displaying the essentially the same listing information in FIG. 36, however the Best Offer price for Order #63 has been updated from $60 to $58. In this example, the user is a buyer of Order #63 and wishes to buy tickets for $25. Another user who is a seller has entered an offer of $25 for the tickets, and the auction system has updated the remote system, and this information is presented to the buyer. Because the seller has chosen to enable "New Best Offer" alerts, the order listing is highlighted 3910 and the text "New Offer" 3912 appears on screen.

Figure 41:
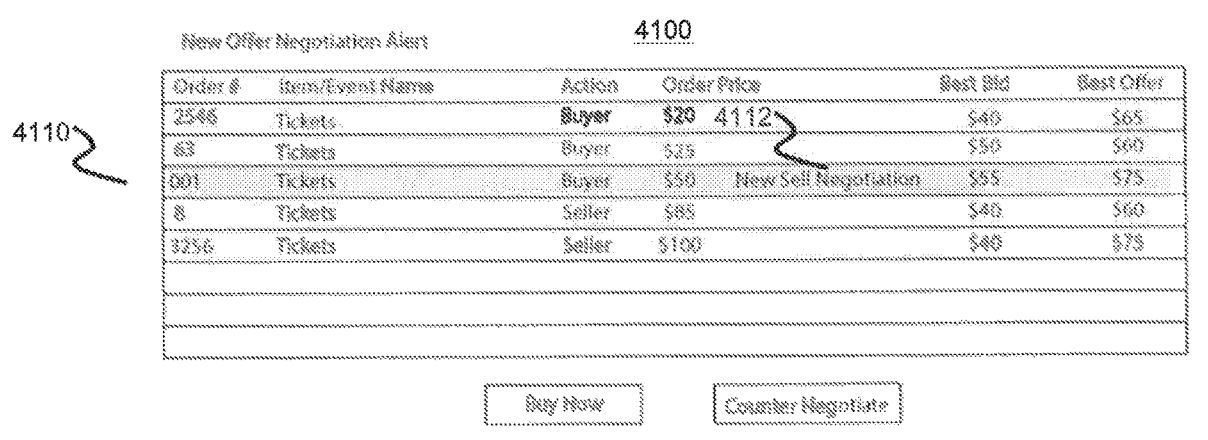

FIG. 40 illustrates a Listing Details page 4000 displaying the essentially the same listing information in FIG. 36. In this example, the user is a seller of Order #3256 and wishes to sell event tickets for $100. Another user who is a buyer has chosen to enter negotiations with the user. Because the buyer has chosen to enable "New Offer Negotiation" alerts, the order listing is highlighted 4010 and the text "New Buy Negotiation" 4012 appears on screen. Similarly, FIG. 41 depicts an example when the user is a buyer of Order #001 and another user who is a seller has chosen to enter negotiations with the user. Because the seller has chosen to enable "New Bid Negotiation" alerts, the order listing is highlighted 4110 and the text "New Sell Negotiation" 4112 appears on screen.

Figure 42:
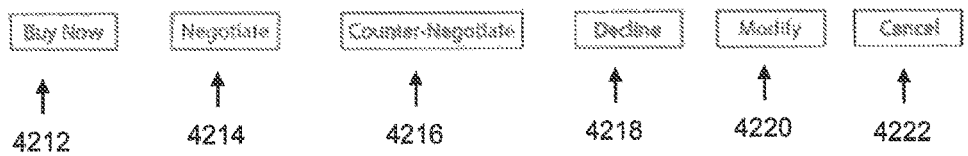
FIG. 42 is an illustration of an example buyer's toolbox of a remote system.

FIG. 42 illustrates a Listing Details page 4200 where the user has highlighted an order listing 4210 in order to interact with it in some way. Because the user is a Buyer of this listing, after the user has selected this order, the user can use the available options to Buy the listing (at the current Best Offer price) 4212, Negotiate 4214, Counter-Negotiate 4216, Decline Negotiation 4218, Modify the Order 4220, or Cancel the order 4222 This functionality can be substantially the same as the detailed Buyer functionality described above.

Figure 43:
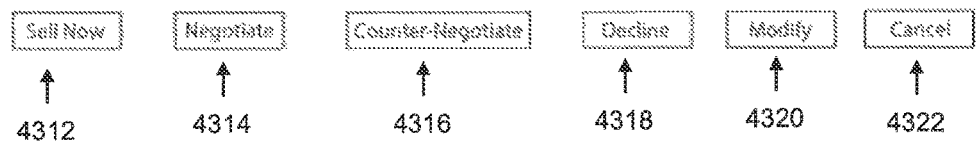
FIG. 43 is an illustration of an example seller's toolbox of a remote system.

FIG. 43 illustrates a Listing Details page 4300 where the user has highlighted an order listing 4310 in order to interact with it in some way. Because the user is a Seller of this listing, when the user has selected an order, the user can use the available options to Sell the listing (at the current Best Bid price) 4312, Negotiate 4314, Counter-Negotiate 4316, Decline Negotiation 4318, Modify the Order 4320, or Cancel the order 4322. This functionality can be substantially the same as the detailed Seller functionality described above.

Dynamic Fees:

Another aspect of the marketplace is the dynamic commissions and fees. While event tickets are used in this example, it is known that anyone of skill in the art could use this marketplace to buy and sell any other kind of item. When a buyer views an offer from a seller the marketplace will automatically add any applicable shipping fees. The marketplace takes into account situations in which a buyer wants to purchase fewer tickets than what a seller has available for sale. For example, if the shipping fee for four tickets that a seller has for sale is $20 and a buyer wants to purchase two of the four tickets then the $20 shipping fee is divided amongst the four available tickets, i.e. $5 shipping fee per ticket.

Figure 44:
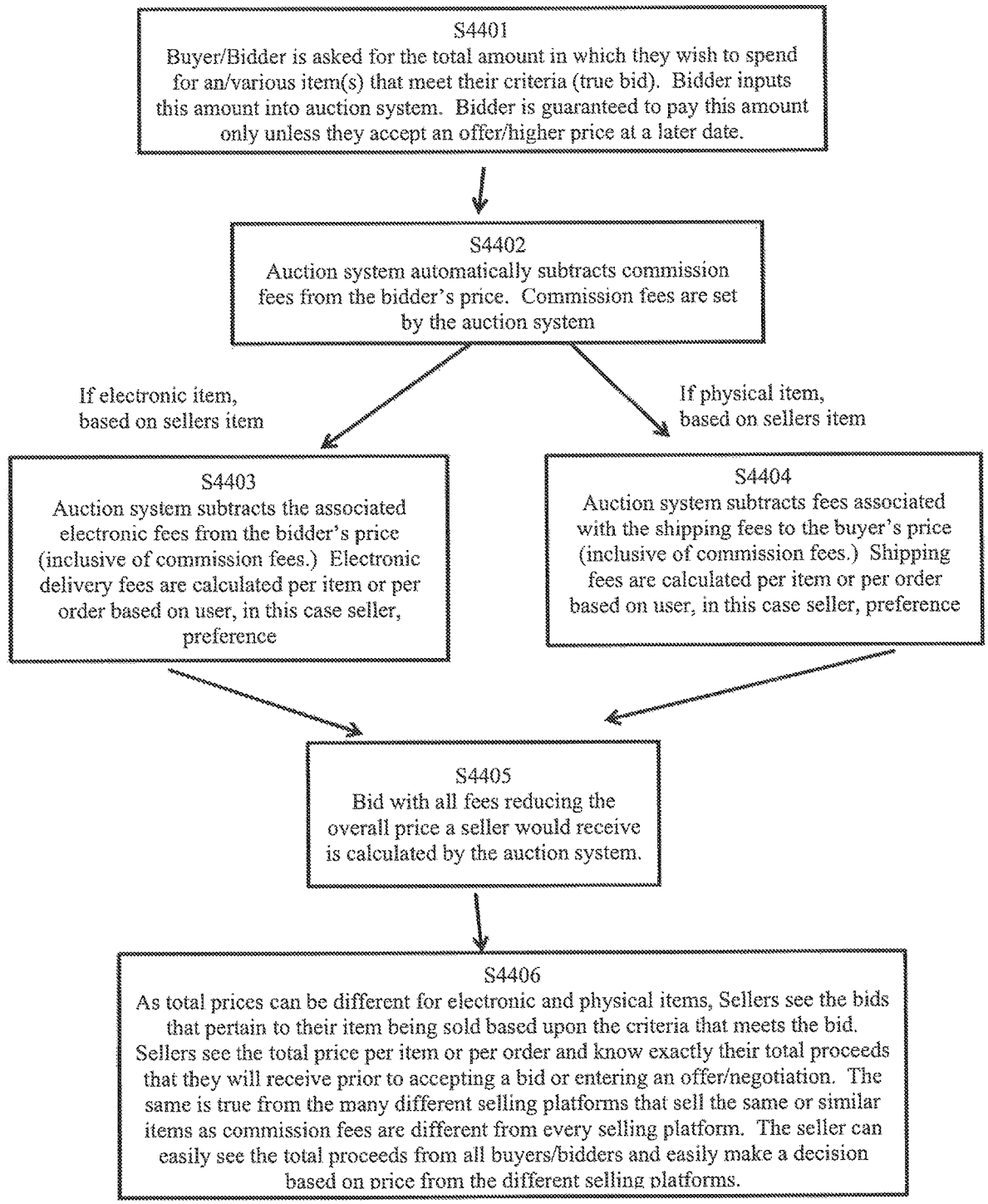
FIG. 44 is a flowchart of the dynamic fees for a buyer.

FIG. 44 shows an example of how the marketplace calculates the amount of money a seller would receive for an item. In S4401, a buyer is asked for the total amount in which they wish to spend for an item that meet their criteria (the true bid). In S4402, a commission fee is subtracted from the true bid. For example, if the marketplace charges a 10% commission and a buyer's bid is $100 then the marketplace would take a $10 commission. In this example the marketplace will display the buyer's bid to the seller as $90, automatically deducting the $10 commission. In S4403, S4404 and S4405, additional shipping or electronic fees are subtracted. For example, if there is a shipping fee for the tickets then the marketplace will automatically deduct the shipping fee. In S4406, the actual amount that a seller would receive from a buyer's true bid is displayed to prospective sellers. Continuing the example, if the true bid is $100 and the shipping fee is $5 then the marketplace will display the buyer's bid as $85 ($100 bid minus the $10 commission and minus the $10 shipping fee). In equation form the calculation for the amount that a seller would receive from a buyer's bid is: [bid−(bid*commission)]−[(electronic fee) or (shipping fee)].

Figure 45:
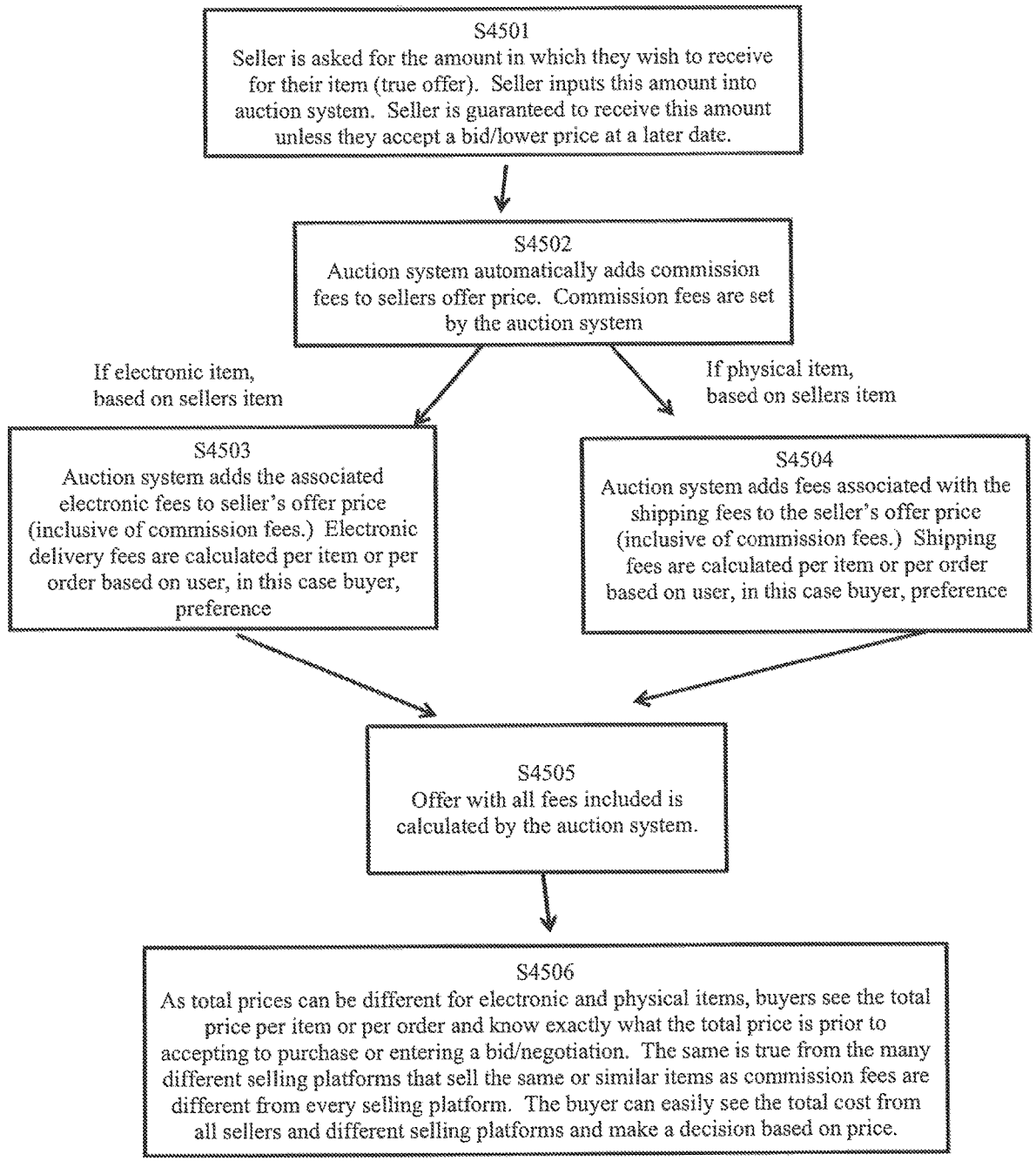
FIG. 45 is a flowchart of the dynamic fees for a seller.

FIG. 45 shows an example of how the marketplace would calculate the amount of money a buyer would have to pay for an item. In S4501, a seller is asked for the amount in which they wish to receive for their item (the true offer). In S4502, a commission fee is added to the true offer. For example, if the marketplace charges a 10% commission and a buyer's bid is $100 then the marketplace would add a $10 commission. In this example the marketplace will display the buyer's bid to the seller as $110, automatically adding the $10 commission. In S4503, S4504 and S4505, additional shipping or electronic fees are added. For example, if there is a shipping fee for the item then the marketplace will automatically add the shipping fee. In S4506, the actual amount that a buyer would have to pay for the item is displayed to prospective buyers. Continuing the example, if a seller's true offer is $100 is for the item and the shipping fee is $5 per ticket then the marketplace will display the price of the item as $115 ($100 bid plus the $10 commission and the $5 shipping fee). In equation form the calculation for the amount that a buyer would have to pay is: [offer+(offer*commission)]+[(shipping fee) or (electronic fee)].

The marketplace may also include a dynamic incentive program. For example a ticket broker may have a large number of tickets available for sale to an event. To encourage ticket brokers to use the marketplace to sell its tickets, the marketplace will give an extra percentage of the profit after the deduction of the commission. Using the buyer's bid of $100 and the 10% commission from above and an example incentive of 5%, the commission would be $10 making the possible net profit to be $90. The incentive would be 5% of the $90, or $4.50. Thus the seller would receive $94.50 for the one or more tickets purchased by the buyer less any applicable shipping fees, see the discussion above.

FIG. 46 is an illustration of one embodiment of the continuous dual auction system's audit or parser system. In one embodiment, the user may be updated in real-time, or substantially real-time, online auction database system webpage that shows a most recent listed price, transaction price, quantity remaining database 4602. In another embodiment, 4603, the webpage may include the old price, new price, quantity of items for user to be alerted of changes and availability of their items of interest.

In one embodiment of the invention 4604, users may be updated only with the quantity available in the market place for the specific items of interest. In one embodiment, 4605, alerts go out for new listing available in the market place and yet another embodiment shows deleted items from the market place, 4606.

Dynamic Events

Another aspect of the marketplace is the dynamic bids across dynamic events for custom dates. While event tickets are used in this example, it is known that anyone of skill in the art could use this marketplace to buy and sell any other kind of item. For instance, if a buyer is looking to purchase tickets for any musical event taking place in city X during the last week of April, the buyer may customize his bid to select from one or musical events, for several different seats, taking place during that custom time frame in his selected city. Once the buyer's bid is accepted by a seller to one event on one date the transaction is finalized. Once the transaction is completed the buyer may instruct the system to cancel all remaining bids for the other several different seats to several different events that occurs on several different dates upon the buyer's wish to cancel his bid.

An example of the dynamic event may be bidding for one or more Elton John concerts in Vegas for the month of April; it may be one or more pop concerts held in New York City during the holiday season. A seller may accept the buyer's offer for Elton John concert for 28 Apr. 2016, row five, seats six through sixteen. Once the transaction is completed between the buyer and the seller, the remaining bids may stay active or be dropped depending on the option the buyer chooses in his initial bid.

The preceding description has been presented only to illustrate and describe various examples or illustrations of the embodiments of invention. It is not intended to be exhaustive or to limit the invention to any precise form disclosed. Many modifications and variations are possible in light of the above teaching. Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

What is claimed is:

1. A non-transitory computer readable storage medium encoded with processing instructions for performing a method of implementing a hybrid marketplace configured for simultaneously implementing a plurality of potential transactions for an item over a network while taking care to avoid unintended sales, the plurality of potential transactions including:

an auction;
a negotiation; and
a direct sale,
the method of implementing the hybrid marketplace comprising:
receiving from a first user device through an item input interface item information and an auction offer price number;
storing the item information and the auction offer price number in a database;
establishing a plurality of computer interfaces accessible over the network for simultaneously conducting the auction, the negotiation, and the direct sale for the item, wherein establishing comprises:
establishing an auction interface comprising retrieving the item information and the auction offer price number from the database and displaying the item information, the auction offer price number and input fields relating to the item;
establishing a negotiation interface comprising retrieving the item information from the database and displaying the item information, a negotiation dialog box for facilitating negotiation communications between the first user device and a second user device, an agreement input, and an agreed upon price input; and
establishing a direct sale interface comprising retrieving the item information and the auction offer price number from the database and displaying the item information, the auction offer price number and a purchase input;
actively receiving user inputs via the plurality of computer interfaces, over the network, and relating to the plurality of potential transactions, wherein actively receiving comprises allowing interaction with one or a combination of the plurality of computer interfaces simultaneously, the interaction with the interfaces comprising:
via the auction interface:
receiving from a third user device a number corresponding to a bid for the item; and
storing the number corresponding to the bid for the item in the database;
via the negotiation dialog box:
receiving from the second user device, a statement regarding a negotiated price for the item;
storing the statement in the database;
prompting the first user device that a negotiation has commenced;
retrieving the statement from the database and presenting the statement to the first user device;
receiving from the first user device, a responsive statement, regarding the negotiated price for the item, and responsive to the statement;
storing the responsive statement in the database;
receiving from the first user device an indication of agreement via the agreement input and an agreed upon price number via the agreed upon price input; and
storing the agreement input and the agreed upon price number in the database; and
via the direct sale interface:
receiving a purchase input from a fourth user device indicating agreement to pay for the item in an amount equal to the auction offer price number; and
storing the purchase input in the database;

continually analyzing the user inputs to determine if any of the transactions have resulted in a sale and identifying the others of the plurality of transactions as nullified transactions, wherein continually analyzing and identifying comprises:

determining if the auction for the item has ended in an auction sale price at the number corresponding to the bid for the item and if the auction has ended in an auction sale price, executing an auction sale and identifying the negotiation for the item and the direct sale for the item as nullified;

monitoring the agreement input and if an agreement input is received, identifying the auction for the item and the direct sale for the item as nullified; and monitoring the purchase input and if a purchase input is received, identifying the auction for the item and the negotiation for the item as nullified; and automatically and immediately converting the nullified transactions to inactive transactions, wherein converting comprises:

when the auction is nullified, displaying an indication that the auction has ended;

when the negotiation transaction is nullified, revoking access of all users to the negotiation dialog box and displaying an indication that the item is no longer available; and when the direct sale is nullified, disabling the purchase input.

2. The non-transitory computer readable storage medium of claim 1, wherein the second user device, the third user device, and the fourth user device are a same user device.

3. The non-transitory computer readable storage medium of claim 1, wherein automatically and immediately converting the nullified transactions to inactive transactions further comprises notifying the second user device, the third user device, and the fourth user device that the item has been sold.

4. The non-transitory computer readable storage medium of claim 3, further comprising identifying the item as an active sale item.

5. The non-transitory computer readable storage medium of claim 4, wherein automatically and immediately converting the nullified transactions to inactive transactions further comprises identifying the item as a completed sale item.

6. The non-transitory computer readable storage medium of claim 5, further comprising receiving updated input from the first user device via the auction interface and modifying the item information, the first number, or the second number based on the updated input.

7. The non-transitory computer readable storage medium of claim 6, further comprising receiving cancellation instructions from the first user device via the auction interface and identifying the auction for the item, the negotiation for the item, and the direct sale for the item as nullified transactions.

8. A non-transitory computer readable storage medium encoded with processing instructions for performing a method of implementing a marketplace configured for implementing an auction for an item over a network, comprising:

receiving from a first user device through an item input interface, item information, a first number as an offer, and a second number as a proxy offer;

storing the item information, the first number, and the second number in a database;

establishing an auction interface accessible over the network comprising retrieving the item information and the first number from the database and displaying the item information, the first number, and input fields relating to the item, the input fields including a bid input and a proxy bid input;

actively receiving user inputs via the auction interface, wherein actively receiving comprises:

receiving from a second user device, a third number via the bid input and a fourth number via the proxy bid input; and storing the third number and the fourth number in the database;

continually comparing the first number to the fourth number and the second number to the third number when any one of the first, second, third, and fourth numbers is entered and when any one of the first, second, third, and fourth numbers changes, wherein:

if the first number is lower than the fourth number, executing a proxy system sale at the first number; or if the second number is lower than the third number, executing a proxy sale at the third number, wherein executing a proxy sale comprises disabling the bid input and the proxy bid input and displaying an indication that the auction has ended.

9. The non-transitory computer readable storage medium of claim 8, wherein executing a proxy sale further comprises closing the auction interface.

10. The non-transitory computer readable storage medium of claim 8, further comprising associating the item information with an active auction identifier.

11. The non-transitory computer readable storage medium of claim 10, wherein executing a proxy sale further comprises associating the item information with a completed auction identifier.

12. The non-transitory computer readable storage medium of claim 10, further comprising receiving updated input from the first user device via the auction interface and modifying the item information, the first number, or the second number based on the updated input.

13. The non-transitory computer readable storage medium of claim 10, further comprising receiving cancellation instructions from the first user device via the auction interface and associating the item information with a cancelled auction identifier.

* * * * *